(12) United States Patent
Shiota

(10) Patent No.: US 10,404,878 B2
(45) Date of Patent: Sep. 3, 2019

(54) IMAGE READING APPARATUS

(71) Applicant: SEIKO EPSON CORPORATION, Tokyo (JP)

(72) Inventor: Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/049,659

(22) Filed: Jul. 30, 2018

(65) Prior Publication Data

US 2019/0037092 A1 Jan. 31, 2019

(30) Foreign Application Priority Data

Jul. 31, 2017 (JP) ................................ 2017-147322

(51) Int. Cl.
*H04N 1/00* (2006.01)
*H04N 1/387* (2006.01)

(52) U.S. Cl.
CPC ....... *H04N 1/00793* (2013.01); *H04N 1/0074* (2013.01); *H04N 1/00689* (2013.01); *H04N 1/00718* (2013.01); *H04N 1/00734* (2013.01); *H04N 1/00745* (2013.01); *H04N 1/3878* (2013.01); *H04N 1/00602* (2013.01); *H04N 1/00628* (2013.01)

(58) Field of Classification Search
CPC ........... H04N 1/00793; H04N 1/00734; H04N 1/3878; H04N 1/00745; H04N 1/0074; H04N 1/00689; H04N 1/00718; H04N 1/00602; H04N 1/00628
See application file for complete search history.

(56) References Cited

U.S. PATENT DOCUMENTS

| | | | |
|---|---|---|---|
| 2005/0035528 A1 | 2/2005 | Suga et al. | |
| 2005/0286916 A1* | 12/2005 | Nakazato | G03G 15/6573 399/16 |
| 2009/0146370 A1 | 6/2009 | Kao | |
| 2010/0148429 A1 | 6/2010 | Kao | |
| 2010/0158595 A1 | 6/2010 | Kao | |

(Continued)

FOREIGN PATENT DOCUMENTS

| | | |
|---|---|---|
| CN | 1576209 A | 2/2005 |
| EP | 0840494 A2 | 5/1998 |

(Continued)

OTHER PUBLICATIONS

European Search Report issued in Application No. 18186416 dated Dec. 21, 2018.

*Primary Examiner* — Neil R McLean
(74) *Attorney, Agent, or Firm* — Workman Nydegger

(57) ABSTRACT

An image reading apparatus includes a pair of first detection sections disposed between first positions for the feeding rollers and the separation rollers for nipping and second positions for the transport roller pair for nipping, and a pair of second detection sections disposed between the first detection sections and the second positions in the medium transport direction. The second detection sections are disposed between the first detection sections in the medium width direction, and a controller determines whether to stop transporting the medium or continue transporting the medium based on the results of detection by the first detection sections and the second detection sections.

10 Claims, 19 Drawing Sheets

(56) References Cited

U.S. PATENT DOCUMENTS

| | | | |
|---|---|---|---|
| 2012/0321365 A1* | 12/2012 | Sendo | G03G 15/6508 |
| | | | 399/410 |
| 2016/0282792 A1 | 9/2016 | Nakata | |
| 2018/0109692 A1* | 4/2018 | Kikuchi | G03G 15/00 |

FOREIGN PATENT DOCUMENTS

| | | |
|---|---|---|
| JP | 09-238250 A | 9/1997 |
| JP | 2004-182419 A | 7/2004 |
| JP | 2008-137734 A | 6/2008 |
| JP | 2016-184827 A | 10/2016 |
| JP | 2016-092478 A | 5/2018 |
| TW | 200924994 A | 6/2009 |
| WO | 2017014104 A1 | 1/2017 |

* cited by examiner

IMAGE READING APPARATUS

BACKGROUND

1. Technical Field

The present invention relates to an image reading apparatus that reads images on documents.

2. Related Art

Some scanners, which are example image reading apparatuses, include a plurality of medium sensors for detecting a document (medium) to be read in a reading section so as to detect skewing of the document and an occurrence of a paper jam (for example, JP-A-2016-184827).

JP-A-2016-184827 describes a skew detecting member for detecting a skewed medium by using a pair of document-width sensors 19 provided in a medium width direction, and a feed-out sensor 17 that is disposed on an upstream side of the document-width sensors 19 in a medium transport direction and between the pair of the document-width sensors 19 in the medium width direction. If the skew amount detected by the skew detecting member exceeds a predetermined amount, the document transport is stopped.

As illustrated in FIG. 6 in JP-A-2016-184827, when the width of the document being transported is substantially the same as the distance between the document-width sensors 19, if the document is slightly shifted in the width direction, the document-width sensor 19 on one side may fail to detect the document. Even if the document is slightly shifted in the width direction, the document may be read by the document-width sensors 19, however, when the document is read by only one document-width sensor 19 on one side, it may be determined that an error has occurred or very large skewing has occurred, and the document transport may be stopped. Accordingly, in reading a document having a medium width close to the distance between the pair of document-width sensors, the transport may be frequently stopped even though the document can be read.

Furthermore, even if the document has been detected by the pair of document-width sensors 19, in some cases, the document may be damaged between the sensors, and such an abnormal state may not be detected by such known structures.

SUMMARY

An advantage of some aspect of the invention is that a transport state of a medium is detected more appropriately and an appropriate process corresponding to the transport state is performed.

An image reading apparatus according to an aspect of the invention for solving the above-mentioned problems includes feeding rollers configured to feed a medium from a medium mounting section on which the medium can be mounted, separation rollers configured to nip and separate the medium with the feeding rollers therebetween, a reading section disposed on a downstream side of the feeding rollers, the reading section being configured to read the medium, a transport roller pair disposed on an upstream side of the reading section, the transport roller pair being configured to transport the medium fed by the feeding rollers toward the reading section, a pair of first detection sections disposed between first positions for the feeding rollers and the separation rollers for nipping and second positions for the transport roller pair for nipping, and disposed at both sides of the feeding rollers and the transport roller pair with a space in a medium width direction that intersects the medium transport direction, the first detection sections being configured to detect the medium, a pair of second detection sections disposed between the first detection sections and the second positions in the medium transport direction and disposed at both sides of the feeding rollers and the transport roller pair with a space in the medium width direction, the second detection sections being configured to detect the medium, and a controller configured to control the transport of the medium based on the results of detection by the first detection sections and the second detection sections. The second detection sections are disposed between the first detection sections in the medium width direction, and the controller determines whether to stop transporting the medium or continue transporting the medium based on the results of detection by the first detection sections and the second detection sections.

According to this aspect of the invention, the second detection sections are disposed between the first detection sections in the medium width direction, and the controller determines whether to stop transporting the medium or continue transporting the medium based on the results of detection by the first detection sections and the second detection sections. Accordingly, transport states that are allowable transport states but determined to be abnormal by known skew detection structures can be detected as allowable transport states. Consequently, unnecessary stop in medium transport can be reduced.

It is preferable that if at least one of the second detection sections has detected the medium and neither of the first detection sections has detected the medium, the controller continue transporting the medium.

When at least one of the second detection sections has detected the medium and neither of the pair of the first detection sections has detected the medium, a medium that has a width narrower than the distance between the pair of the first detection sections may be transported. Even if the small medium is transported in a skewed state, problems that may damage the medium will not occur. Furthermore, even if the read image becomes an oblique image, the image data will be corrected by rotating the image, and accordingly, the medium can be transported for image reading without problems. With this configuration, the medium transport is not stopped when a small medium is transported in a skewed state. Accordingly, unnecessary frequent stop in transporting a medium can be reduced.

It is preferable that if one of the second detection sections has detected the medium and both of the first detection sections have detected the medium, the controller stop transporting the medium.

With this configuration, if one of the second detection sections has detected the medium and both of the first detection sections have detected the medium, the controller stops transporting the medium. Accordingly, the transport of a skewed medium can be more reliably stopped.

It is preferable that if one of the second detection sections has detected the medium, the first detection section on the same side as the one second detection section that has detected the medium has not detected the medium, and the other first detection section has detected the medium, the controller stop transporting the medium.

With this configuration, if one of the second detection sections has detected the medium, the first detection section on the same side as the one second detection section that has detected the medium has not detected the medium, and the other first detection section has detected the medium, the controller stops transporting the medium. Accordingly, the transport of a skewed medium can be more reliably stopped.

It is preferable that the image reading apparatus include a third detection section disposed between the second detection sections in the medium width direction and at a position on a downstream side of the first positions and on an upstream side of the second detection sections in the medium transport direction, the third detection section being configured to detect the medium, and if at least one of the second detection sections has detected the medium and the third detection section has not detected the medium, the controller stops transporting the medium.

For example, if the medium is caught at the nip positions (first positions) of the feeding rollers and the separation rollers and causes a paper jam, the medium may be creased and deformed, only end portions of the medium in the width direction may be moved toward the downstream side from the nip positions (first positions), and may be detected by the second detection sections. The medium detected by the second detection sections is determined that the medium is normally transported even though a paper jam has occurred, and the transport of the medium is continued, and thereby the paper jam becomes severe. With this configuration, if at least one of the second detection sections has detected the medium and the third detection section has not detected the medium, the controller stops transporting the medium. Accordingly, the problem in which end portions in the medium width direction are transported forward and the transport of the medium is delayed in a region between the second detection sections can be detected, and the transport of the medium can be stopped. Therefore, the medium can be prevented from being largely damaged to cause a paper jam.

It is preferable that the third detection section be disposed on the upstream side of the first detection sections in the medium transport direction, and if at least one of the first detection sections has detected the medium and the third detection section has not detected the medium, the controller stop transporting the medium.

With this configuration, the problem in which end portions in the medium width direction are transported forward and the transport of the medium is delayed in a region between the first detection sections can be detected at a position closer to the feeding rollers, and the transport of the medium can be stopped.

It is preferable that the first detection sections be disposed at positions overlapping part of the feeding rollers in the medium transport direction.

With the image reading apparatus in which the first detection sections are disposed at positions overlapping part of the feeding rollers in the medium transport direction, operational advantages similar to those in the above configurations can be achieved.

It is preferable that the distance between the second detection section and the second position in the medium transport direction be shorter than the distance between the first detection section and the first position in the medium transport direction.

With the image reading apparatus in which the distance between the second detection section and the second position in the medium transport direction is shorter than the distance between the first detection section and the first position in the medium transport direction, operational advantages similar to those in the above configurations can be achieved.

It is preferable that the feeding rollers and the transport roller pair be disposed in a central area in the medium width direction.

With the image reading apparatus in which the feeding rollers and the transport roller pair are disposed in a central area in the medium width direction, an operational advantage similar to one of those in the above configurations can be achieved.

According to another aspect of the invention, an image reading apparatus includes feeding rollers configured to feed a medium from a medium mounting section on which the medium can be mounted, separation rollers configured to nip and separate the medium with the feeding rollers therebetween, a reading section disposed on a downstream side of the feeding rollers, the reading section being configured to read the medium, a transport roller pair disposed on an upstream side of the reading section, the transport roller pair being configured to transport the medium fed by the feeding rollers toward the reading section, a pair of downstream side detection sections disposed between first positions for the feeding rollers and the separation rollers for nipping and second positions for the transport roller pair for nipping, and provided at both sides of the feeding rollers and the transport roller pair with a space in a medium width direction that intersects the medium transport direction, the downstream side detection sections being configured to detect the medium, an upstream side detection section disposed between the downstream side detection sections in the medium width direction and between the first positions and the downstream side detection sections in the medium transport direction, the upstream side detection section being configured to detect the medium, and a controller configured to control the transport of the medium based on the results of detection by the downstream side detection sections and the upstream side detection section. If at least one of the downstream side detection sections has detected the medium and the upstream side detection section has not detected the medium, the controller stops transporting the medium.

According to this aspect, if at least one of the downstream side detection sections has detected the medium and the upstream side detection section has not detected the medium, the controller stops transporting the medium. With this configuration, a problem in which end portions in the medium width direction are transported forward and the transport of the medium is delayed in a region between the downstream side detection sections can be detected, and the transport of the medium can be stopped. Accordingly, the medium can be prevented from being largely damaged to cause a paper jam.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

First, an image reading apparatus according to an embodiment of the invention will be briefly described. In this embodiment, as an example image reading apparatus, a document scanner (hereinafter, simply referred to as a scanner 1) that can read an image on at least one of the front surface and the back surface of a medium will be described.

Figure 1:
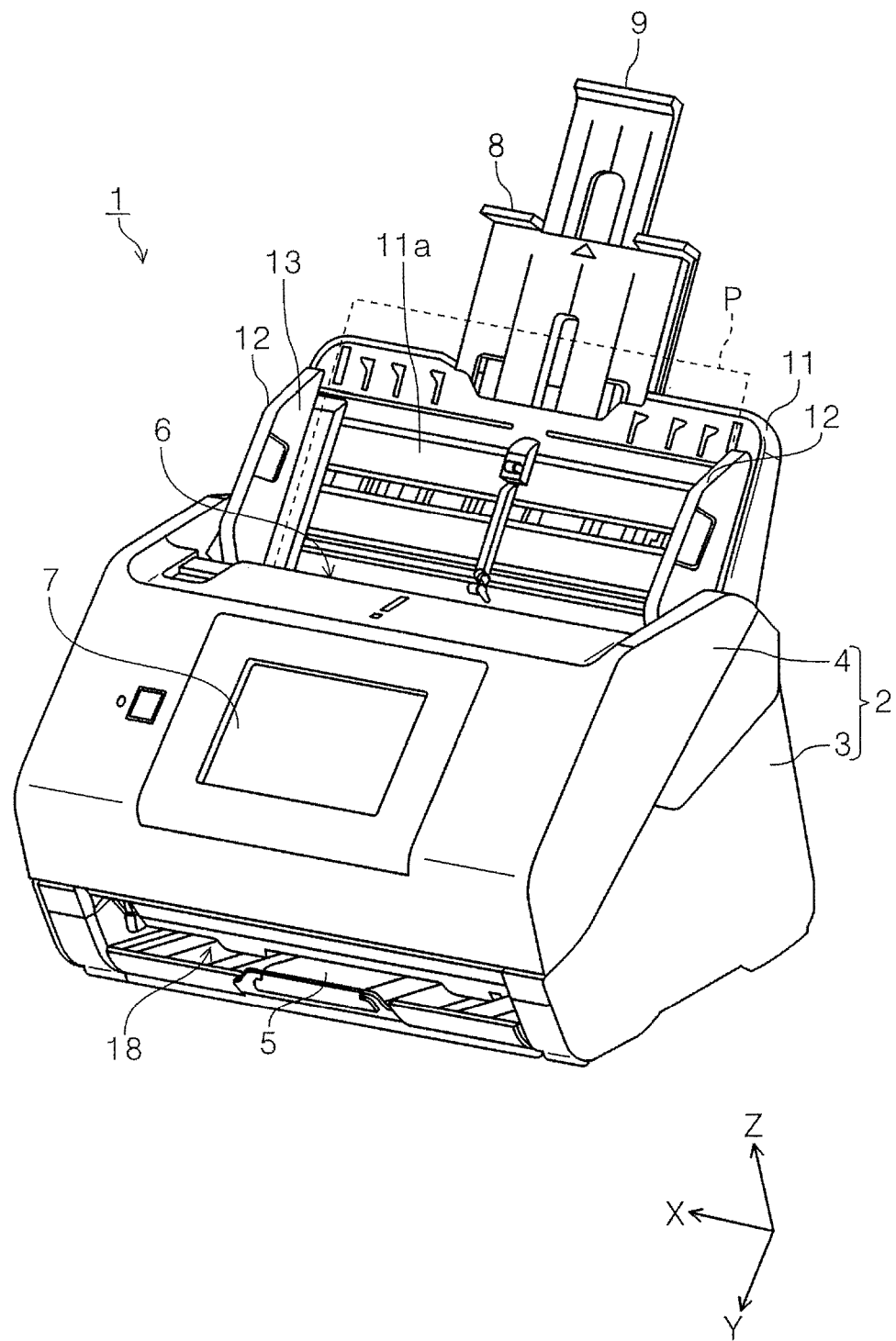
FIG. 1 is an external perspective view of a scanner according to an embodiment of the invention.
Figure 2:
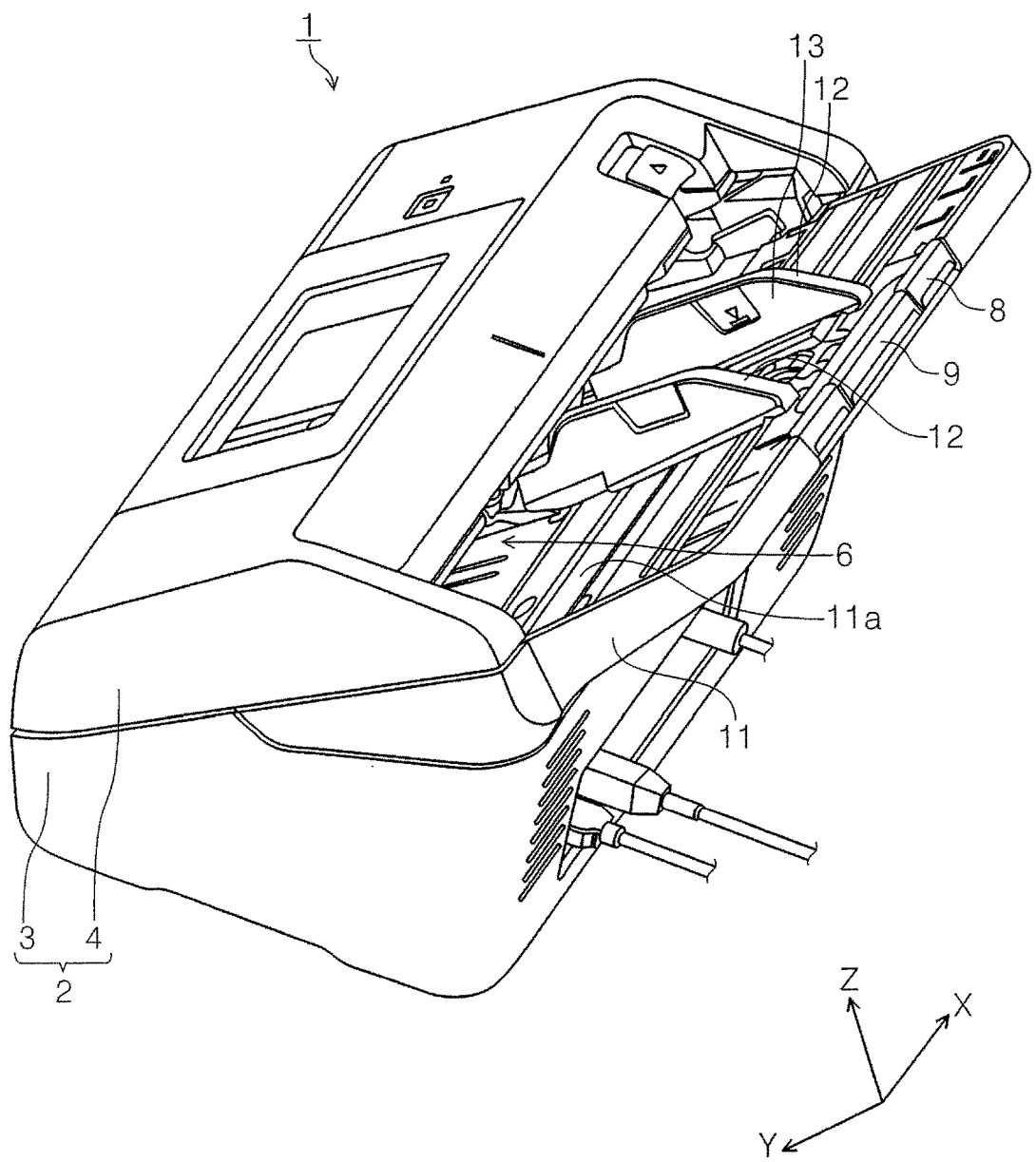
FIG. 2 is a perspective view of the scanner according to the embodiment viewed from another angle.
Figure 3:
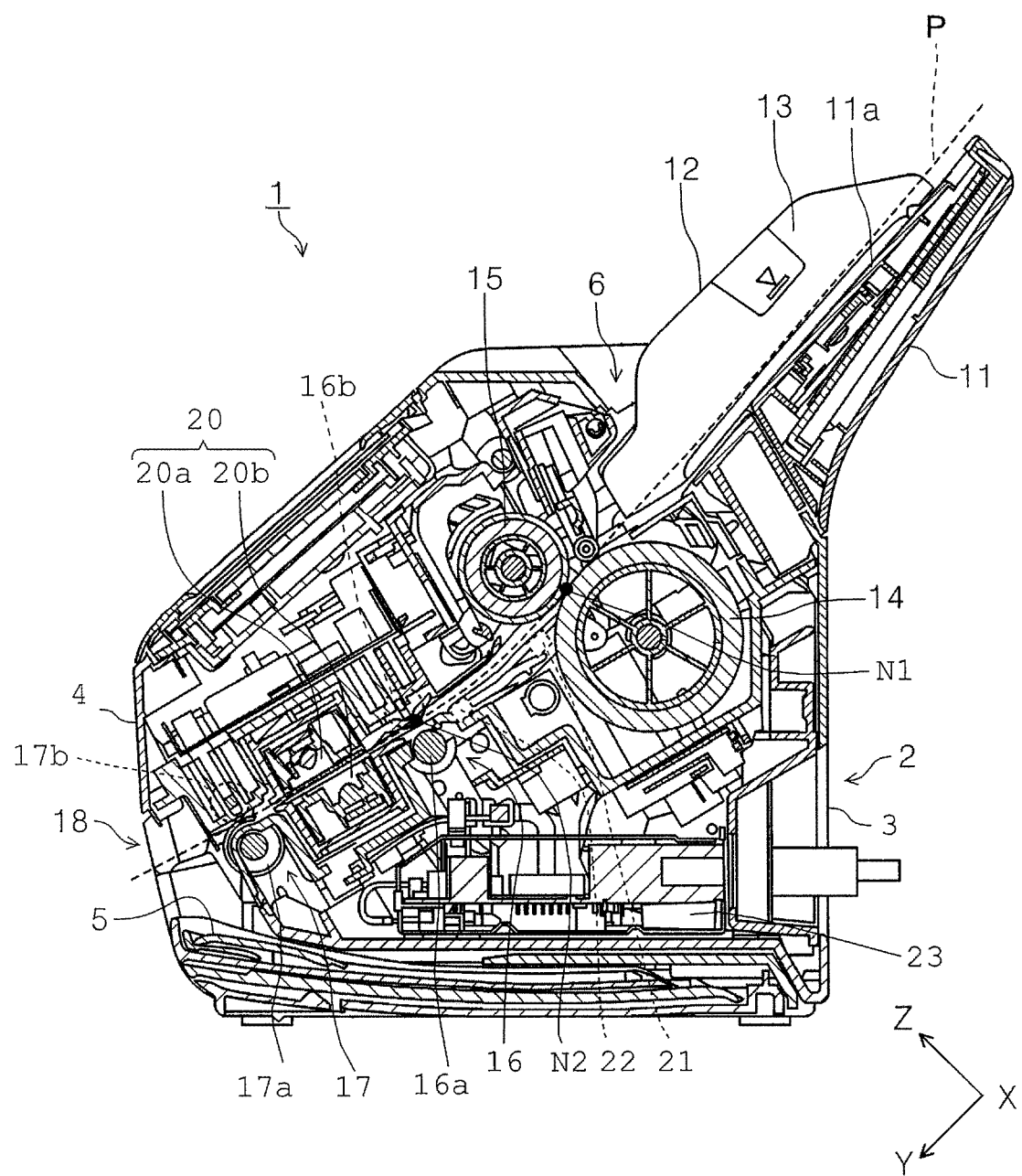
FIG. 3 is a side cross-sectional view of a sheet transport path in the scanner according to the embodiment.
Figure 4:
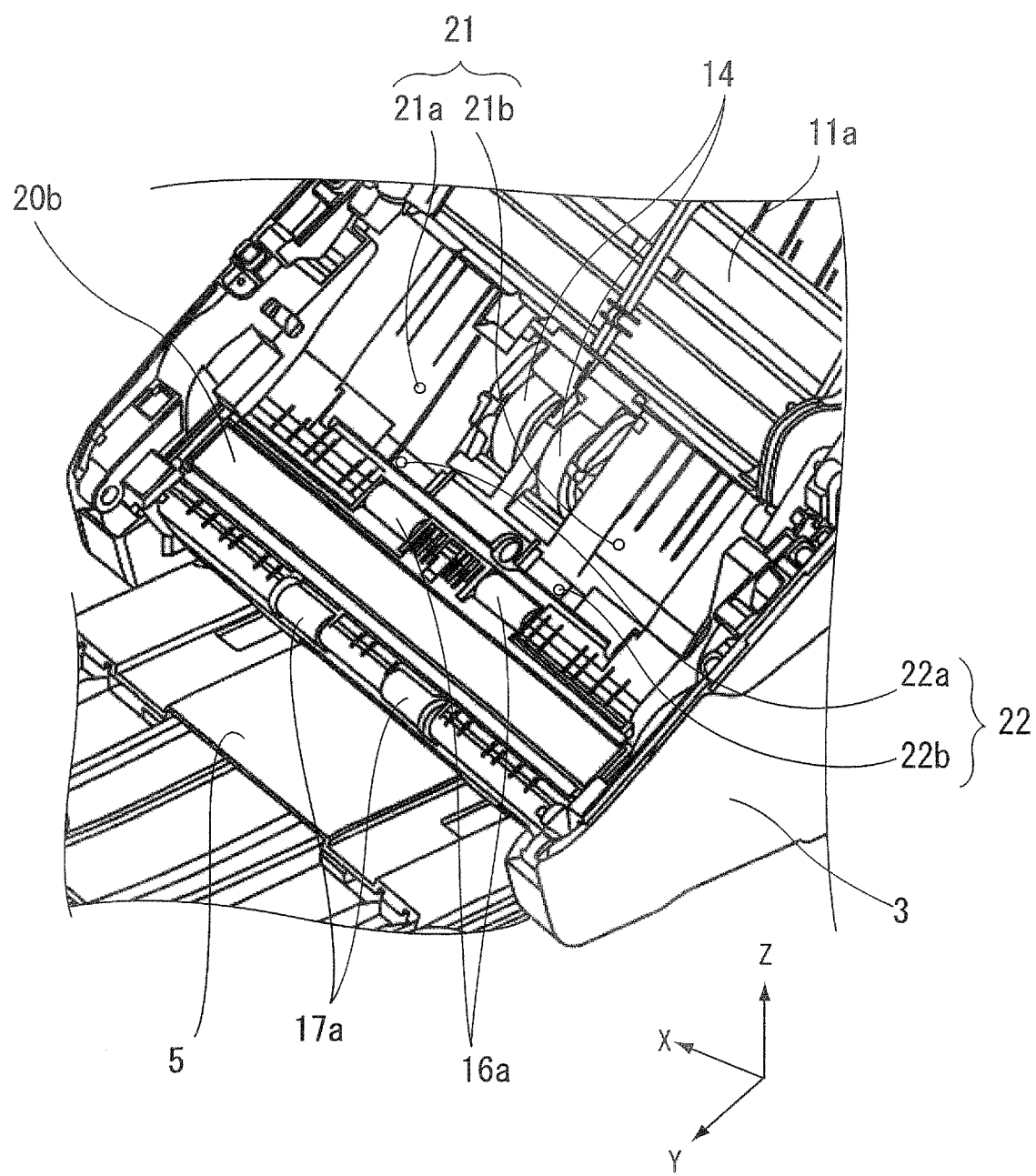
FIG. 4 is a perspective view illustrating a lower unit from which an upper unit has been detached.
Figure 5:
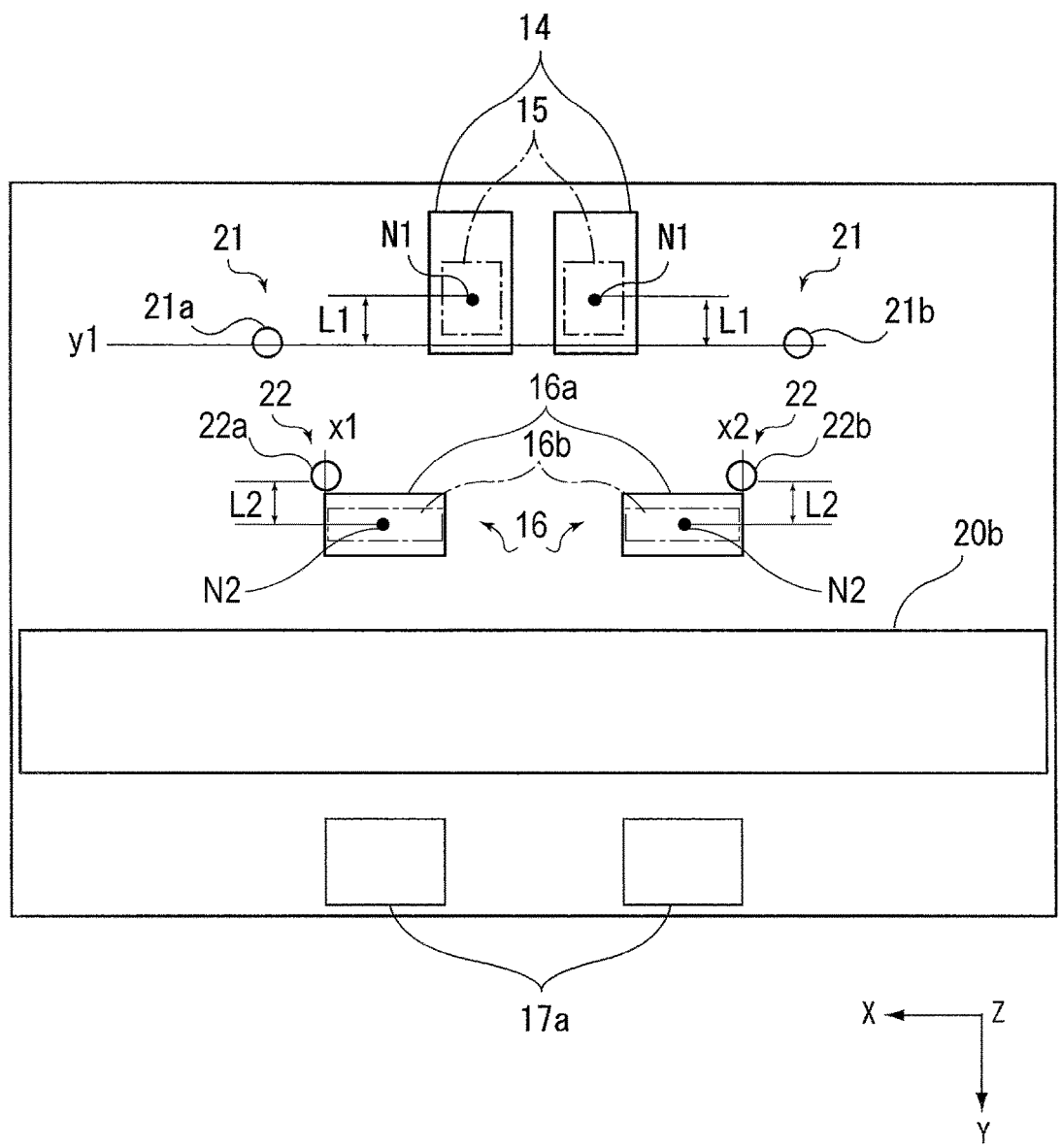
FIG. 5 is a schematic plan view illustrating main components according to the first embodiment.
Figure 6:
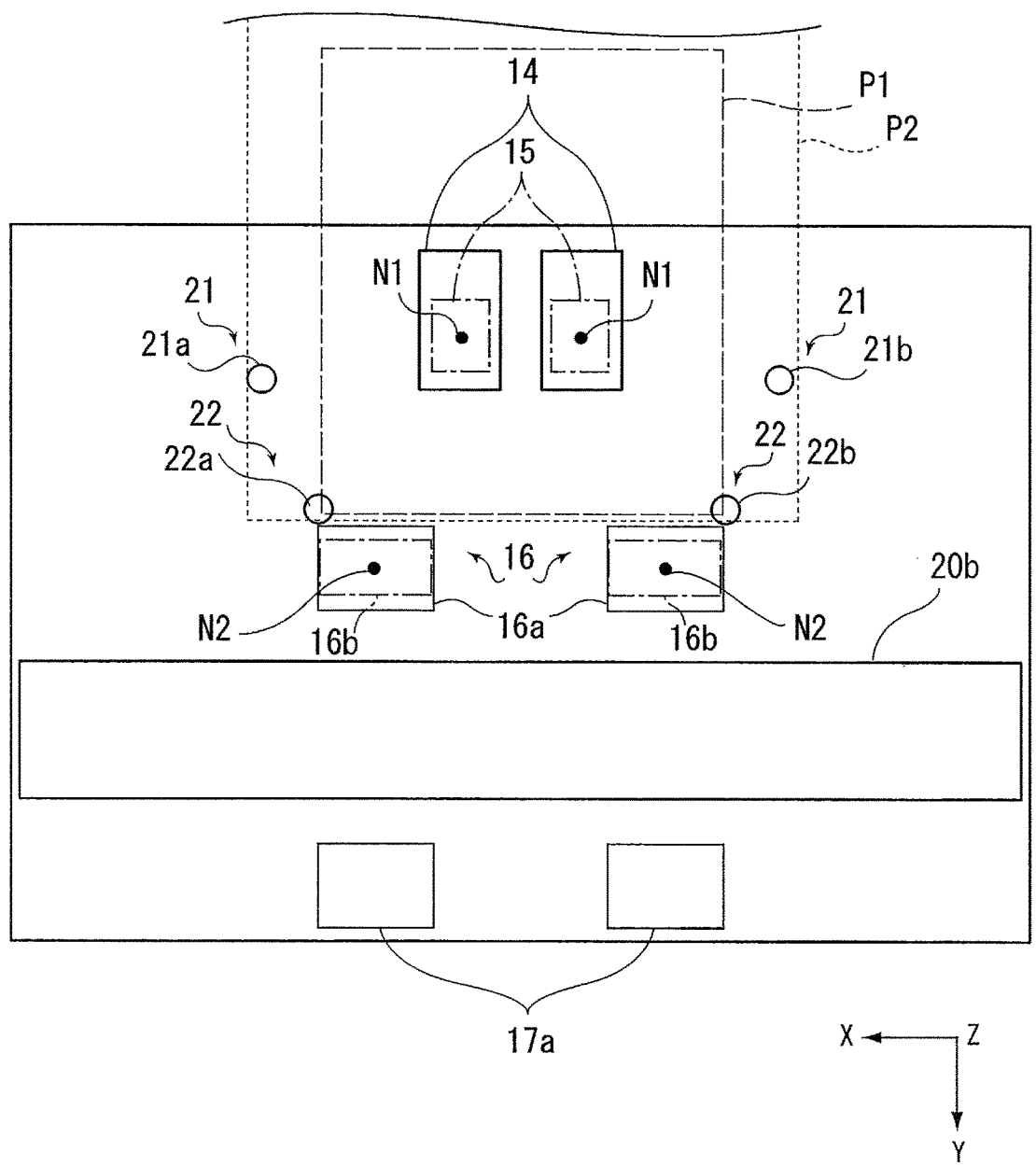
FIG. 6 illustrates transport states of sheets.

FIG. 1 is an external perspective view of the scanner according to the embodiment of the invention. FIG. 2 is a perspective view of the scanner according to the embodiment viewed from another angle. FIG. 3 is a side cross-sectional view of a sheet transport path in the scanner according to the embodiment. FIG. 4 is a perspective view illustrating a lower unit from which an upper unit has been detached. FIG. 5 is a schematic plan view illustrating main components according the first embodiment. FIG. 6 illustrates transport states of sheets. FIG. 7 to FIG. 10 illustrate the other transport states of the sheets.

In the X-Y-Z coordinate system in the drawings, the X direction denotes an apparatus width direction, that is, a sheet width direction, and the Y direction denotes a sheet transport direction. The Z direction intersects the Y direction and is approximately orthogonal to a surface of a sheet that is being transported. Furthermore, the +Y direction side denotes an apparatus front side, and the -Y direction side denotes an apparatus back side. The left side viewed from the apparatus front side denotes the +X direction, and the right side denotes the -X direction. The +Z direction side denotes an apparatus upper side (including upper sections, upper surfaces, and the like), and the -Z direction side denotes an apparatus lower side (including lower sections, lower surfaces, and the like). A direction (+Y direction side) toward which a sheet P is transported denotes "downstream" and the opposite direction (-Y direction side) denotes "upstream".

Overview of Scanner

Hereinafter, the scanner 1 according to the embodiment of the invention will be described mainly with reference to FIG. 1 and FIG. 2. The scanner 1 illustrated in FIG. 1 and FIG. 2 has an apparatus body 2 that includes in it a reading section 20 (FIG. 3) for reading an image on a sheet P. The apparatus body 2 includes a lower unit 3 and an upper unit 4. The upper unit 4 is attached to the lower unit 3 so as to be rotatable about its downstream side in a sheet transport direction as a rotation axis with respect to the lower unit 3. The upper unit 4 can be rotated and opened toward the apparatus front side so as to expose a sheet transport path of the sheet P for a user to readily fix a paper jam.

A medium mounting section 11 that has a mounting surface 11a, on which a sheet P to be fed can be mounted, is provided on the apparatus back side (-Y axis direction side) of the apparatus body 2. The medium mounting section 11 can be detachably attached to the apparatus body 2. The medium mounting section 11 is provided with a pair of left and right edge guides 12 each having a guide surface 13 for guiding a side edge of a sheet P in the width direction (the X-axis direction) that intersects the feeding direction (the Y-axis direction) of the sheet P.

The edge guides 12 can be slid in the X-axis directions in accordance with the size of the sheet P. In this embodiment, the edge guides 12 are configured such that following an X movement of one edge guide 12 (for example, toward the +X side), the other edge guide 12 moves in the opposite direction (toward the -X side) by a known rack-and-pinion mechanism. Specifically, on the medium mounting section 11, a sheet P is centered in the width direction and is to be fed by so-called center paper feeding. In FIG. 1, the edge guides 12 are at the outermost positions, and in FIG. 2, the edge guides 12 are at the innermost positions. The outermost positions (FIG. 1) of the edge guides 12 correspond to, for example, a short side width of an A3-size sheet, and the innermost positions (FIG. 2) of the edge guides 12 correspond to, for example, a short side of a card-size sheet.

The medium mounting section 11 is provided with a first auxiliary paper support 8 and a second auxiliary paper support 9. The first auxiliary paper support 8 and the second auxiliary paper support 9 can be stored inside the medium mounting section 11 as illustrated in FIG. 2, and can be pulled out from the medium mounting section 11 as illustrated in FIG. 1 such that the length of the mounting surface 11a can be adjusted.

The apparatus body 2 has an operation panel 7 on the apparatus front side of the upper unit 4. The operation panel 7 is used to set various settings for reading, execute a reading operation, display reading setting contents, or the like. A feed port 6 that is connected to the inside of the apparatus body 2 is provided at an upper portion of the upper unit 4. A sheet P mounted on the medium mounting section 11 is fed from the feed port 6 toward a reading section 20 provided in the apparatus body 2. A discharge tray 5, which will be described below, is provided on the apparatus front side of the lower unit 3.

Sheet Transport Path in Scanner

Next, the sheet transport path in the scanner 1 will be described mainly with reference to FIG. 3. The dotted line in FIG. 3 denotes a transport path of a sheet P. On the downstream side of the medium mounting section 11, feeding rollers 14 that feed a sheet P mounted on the mounting surface 11a of the medium mounting section 11 toward the reading section 20 and separation rollers 15 that nips and separates the sheet P with the feeding rollers 14 are provided. The feeding rollers 14 and the separation rollers 15 are provided in a central area in the medium width direction (X-axis direction) that intersects the medium transport direction (+Y direction) as illustrated in FIG. 4 and FIG. 5.

Returning to FIG. 3, the sheet P mounted on the mounting surface 11a of the medium mounting section 11 is picked by the feeding rollers 14, which are rotatable with respect to the lower unit 3, and fed toward the downstream side (+Y direction side). Specifically, the feeding rollers 14 rotate while coming into contact with the surface of the sheet P that faces the mounting surface 11a and thereby the sheet P is fed toward the downstream side. Consequently, when a plurality of sheets P is set on the medium mounting section 11 in the scanner 1, the sheets are fed sequentially from the sheet P on the side of the mounting surface 11a toward the downstream side.

A transport roller pair 16, the reading section 20 for reading a sheet P (document), and a discharging roller pair 17 are disposed on the downstream side of the feeding rollers 14. The transport roller pair 16 are disposed on the upstream side of the reading section 20 so as to transport a sheet P fed by the feeding rollers 14 toward the reading section 20. The transport roller pair 16 is provided in a central area in the medium width direction similarly to the feeding rollers 14 (FIG. 4 and FIG. 5).

In the medium transport direction, a pair of first detection sections 21 and a pair of second detection sections 22 for detecting a sheet P are disposed between first positions N1 for the feeding rollers 14 and the separation rollers 15 for nipping, and second positions N2 for the transport roller pair 16 for nipping (see also FIG. 5). In this embodiment, a controller 23 (FIG. 3), which will be described below, controls the transport of a sheet P based on the results of detection by the first detection sections 21 and the second detection sections 22. Specific configurations of the first detection sections 21 and the second detection sections 22, and the control by the controller 23 will be described below in detail.

The reading section 20 includes an upper read sensor 20a that is provided on the side of the upper unit 4 and a lower read sensor 20b that is provided on the side of the lower unit 3. In this embodiment, as an example, the upper read sensor 20a and the lower read sensor 20b are configured as a contact image sensor (CIS) module.

After an image on at least one of the front side and the back side of a sheet P has been read in the reading section 20, the sheet P is nipped by a discharging roller pair 17 that is disposed on the downstream side of the reading section 20 and discharged from a discharge port 18 that is provided on the apparatus front side of the lower unit 3. In this embodiment, the feeding rollers 14, the transport roller pair 16, and the discharging roller pair 17 are driven to rotate by at least one drive source (not illustrated) disposed in the lower unit 3. The drive source (not illustrated) is controlled by the controller 23, that is, the driving of the feeding rollers 14, the transport roller pair 16, and the discharging roller pair 17 is controlled. In other words, the controller 23 controls the transport of the sheet P.

The lower unit 3 includes a discharge tray 5 that can be extended from the discharge port 18 toward the apparatus front side. The discharge tray 5 can be switched between a state (FIG. 1) in which the discharge tray 5 is retracted into the bottom section of the lower unit 3 and a state (not illustrated) in which the discharge tray 5 is extended toward the apparatus front side. In the state the discharge tray 5 is extended, the sheet P that is discharged from the discharge port 18 can be stacked on the discharge tray 5.

First Detection Section and Second Detection Section

This embodiment employs, as the first detection sections 21 and the second detection sections 22 for detecting a sheet, optical sensors having a light emitting section (not illustrated) for emitting light and a light receiving section (not illustrated) for receiving the reflected light of the light emitted by the light emitting section. Instead of the optical sensors, ultrasonic sensors having an emitting section for emitting ultrasonic waves and a receiving section that is disposed to face the emitting section across a transported sheet may be used. Alternatively, an optical lever sensor or an electrical-contact lever sensor that detect a positional change of a mechanical lever that is moved by the contact of a transported sheet may be used.

Arrangement of First Detection Sections

The first detection sections 21 are disposed between the first positions N1 (FIG. 5 and FIG. 3) for the feeding rollers 14 and the separation rollers 15 for nipping and the second positions N2 (FIG. 5 and FIG. 3) for the transport roller pair 16 for nipping in the medium transport direction (+Y direction) as illustrated in FIG. 4 and FIG. 5. In the medium width direction (X-axis direction), the first detection sections 21 are provided as a pair with a space such that the first detection sections 21 are disposed at both sides of the feeding rollers 14 and the transport roller pair 16. The pair of the first detection sections 21 includes a first detection section 21a on the +X direction side and a first detection section 21b on the −X direction side. In the following description, the first detection sections 21 that are simply referred to as first detection section 21 mean both of the first detection sections of the pair.

In this embodiment, the first detection section 21 is provided at positions overlapping part of the feeding rollers 14 in the medium transport direction (FIG. 3 and FIG. 5). Specifically, as illustrated in FIG. 5, at the position y1 in the Y-axis direction, the first detection section 21 overlaps the feeding rollers 14.

Arrangement of Second Detection Sections

The second detection sections 22 are disposed between the first detection section 21 and the second positions N2 in the medium transport direction as illustrated in FIG. 4 and FIG. 5. In the medium width direction, the second detection sections 22 are provided as a pair with a space such that the second detection sections 22 are disposed at both sides of the feeding rollers 14 and the transport roller pair 16. The pair of the second detection sections 22 are disposed between the pair of first detection sections 21 in the medium width direction. The pair of the second detection sections 22 includes a second detection section 22a on the +X direction side and a second detection section 22b on the −X direction side. In the following description, the second detection sections 22 that are simply referred to as second detection section 22 mean both of the second detection sections of the pair.

In this embodiment, the pair of the second detection sections 22 is disposed at both sides very close to the transport roller pair 16 in the medium width direction, and overlaps part of end portions of the transport roller pair 16 in the X-axis direction. Specifically, in FIG. 5, the second detection section 22a on the +X direction side overlaps an end position x1 of the transport roller pair 16 on the +X direction side, and the second detection section 22b on the −X direction side overlaps an end position x2 of the transport roller pair 16 on the −X direction side. The second detection section 22 may be disposed at any position in the medium width direction as long as the second detection section 22 is close to the transport roller pair 16 and does not overlap the end portions of the transport roller pair 16.

As illustrated in FIG. 5, the first detection section 21 and the second detection section 22 are disposed such that a distance L2 between the second detection section 22 and the second position N2 in the medium transport direction (+Y direction) is shorter than a distance L1 between the first detection section 21 and the first position N1 in the medium transport direction.

Furthermore, in this embodiment, the first detection section 21 and the second detection section 22 are disposed within a region corresponding to the width of the shorter side of an A6-size sheet (reference numeral P2 in FIG. 6). The second detection section 22 is disposed within a region corresponding to the width of a shorter side of a sheet (for example, a card or a business card size: P1 in FIG. 6) that has a size close to the A6-size sheet and is smaller than the A6-size sheet. It is preferable that the pair of first detection sections 21 be disposed just outside the pair of the second detection sections 22 as much as possible.

Control Operation by Controller

As mentioned above, the controller 23 controls the transport of a medium based on the results of detection by the first detection section 21 and the second detection section 22. In this embodiment, the controller 23 determines whether to stop or continue transporting a sheet P based on the results of detection by the first detection section 21 and the second detection section 22. Hereinafter, specific control operations by the controller 23 will be described.

Basic Skew Determination and Control by Controller

Figure 7:
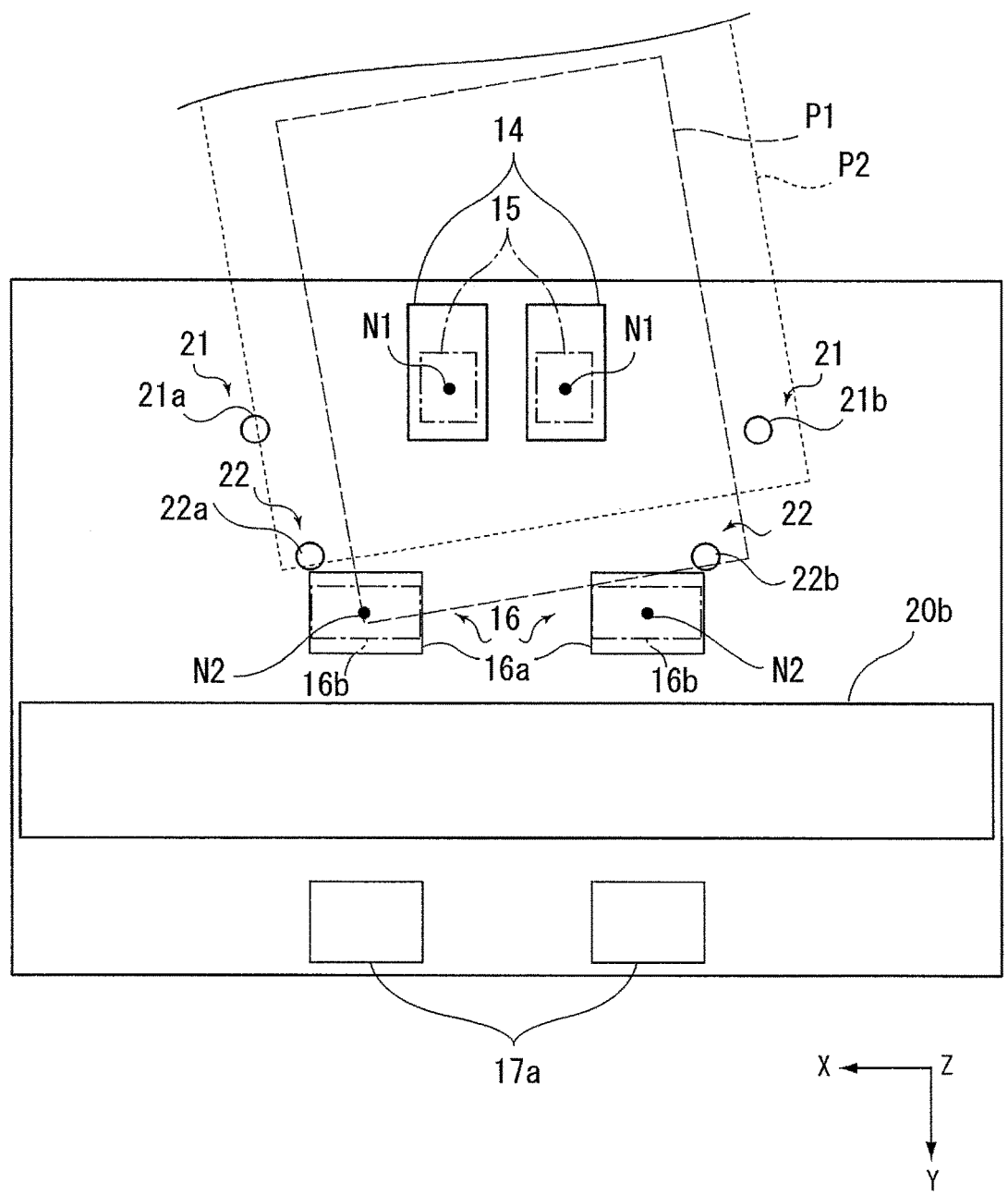
FIG. 7 illustrates other transport states of the sheets.

The second detection sections 22a and 22b detect a sheet to determine whether skewing, an oblique movement of a leading edge of a sheet, has occurred. When a sheet is transported straight without skewing, the second detection sections 22a and 22b detect the sheet as illustrated in FIG. 6. When a sheet is transported with skewing, one of the second detection sections 22a and 22b detects the sheet as illustrated in FIG. 7. More specifically, after one of the second detection sections 22a and 22b has detected a sheet, if the other second detection section detects the sheet within a predetermined time, the controller 23 determines that the sheet is normally transported and continues transporting the sheet, whereas if the other second detection section detects no sheet, the controller 23 determines that skewing has occurred and stops transporting the sheet. As described above, the "predetermined time" is a time for determining whether skewing has occurred, and a person skilled in the art can set a specific time depending on an apparatus structure, apparatus dimensions, or the like.

Figure 8:
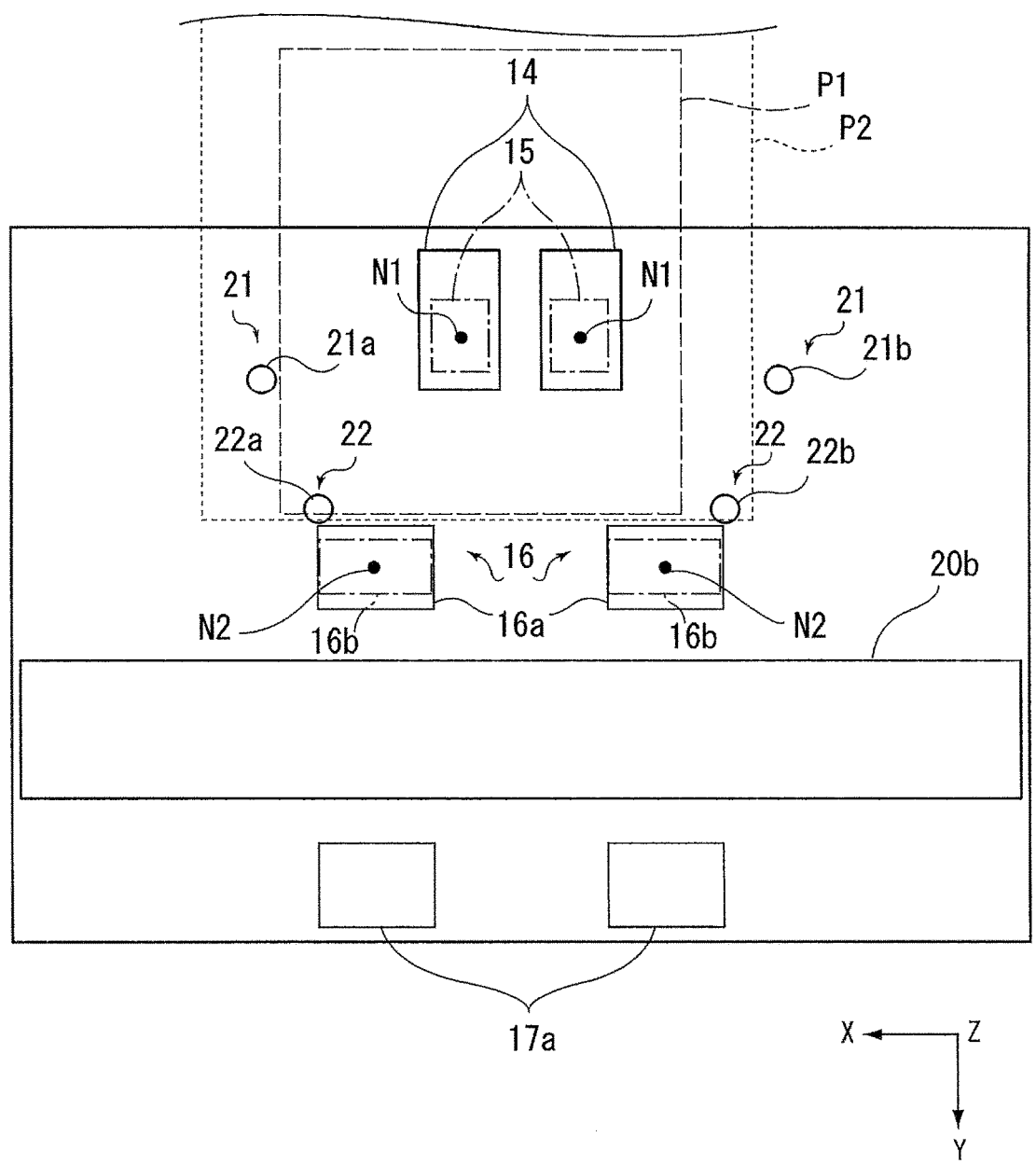
FIG. 8 illustrates other transport states of the sheets.
Figure 9:
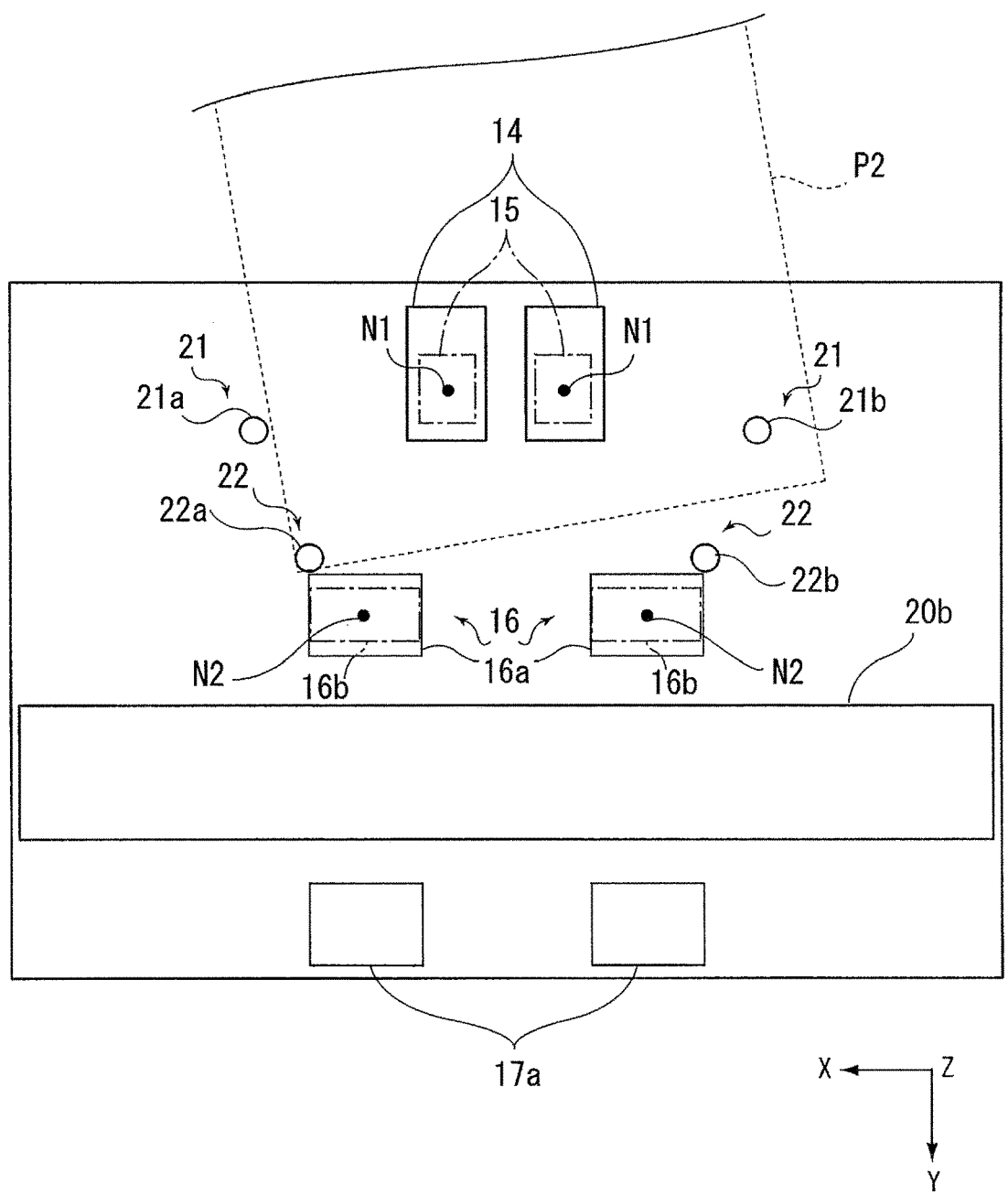
FIG. 9 illustrates another transport state of the sheet.

A sheet having a sufficient width can be detected by both of the second detection sections 22a and 22b even if the sheet is shifted in the medium width direction, however, if a sheet P1 having a width close to the distance between the pair of the second detection sections 22 is shifted in the medium width direction, only one of the pair of the second detection sections 22 can detect the sheet P1. For example, if the sheet P is shifted in the +X direction, even if the sheet P1 is normally transported straight, the sheet P1 is detected only by the second detection section 22a but not detected by the second detection section 22b as illustrated in FIG. 8. Since the state (FIG. 8) in which only one of the pair of second detection sections 22 (the second detection section 22a in FIG. 8) has detected the sheet P1, which is shifted in the medium width direction but transported straight without skewing, and the other one (the second detection section 22b in FIG. 8) has not detected the sheet P1 within a predetermined time is similar to the state (FIG. 7) in which the skewed sheet is transported, it is erroneously determined that the sheet P1 in FIG. 8 has been skewed. Due to the erroneous skew detection, the sheet P1 having the width close to the distance between the pair of the second detection sections 22 may be frequently stopped.

Even if the skewed small sheet having the width close to the distance between the pair of second detection sections 22 is read by the reading section 20 and the read image becomes an oblique image, the image data will be corrected by rotating the image, and accordingly, the transport of the sheet may be continued without problems. Furthermore, even if the skewed small sheet is transported, problems that may damage the sheet will not occur, and thus the transport of the sheet may be continued. However, if it is determined that the sheet has been skewed, the transport of the sheet is stopped, and thereby the frequency of stops increases. To cope with such problems including the stopping of transport due to erroneous skew detection of small sheets and the stopping of transport due to erroneous skew determination of sheets that can provide usable images by correction, the controller 23 performs the following control.

Cases Controller Continues Transporting Based on Determination Results by First Detection Sections and Second Detection Sections The controller 23 continues transporting the sheet P1 when at least one of the pair of the second detection sections 22 has detected the sheet P1 and neither of the pair of the first detection sections 21 has detected the sheet P1, for example, the sheet P1 illustrated in FIG. 7 or the sheet P1 illustrated in FIG. 8. In other words, if the sheet that has been detected by one of the second detection sections 22a and 22b is not detected by the other one within the predetermined time (that is, the sheet is beyond an allowable skew range), if neither of the pair of the first detection sections 21 has detected the sheet P1, the transport of the sheet P1 is continued.

Under this control, the sheet transport is not stopped when a small sheet P1 is transported in a state in which the sheet P1 is shifted in the medium width direction (FIG. 8) or a skewed sheet P1 is transported (FIG. 7). Accordingly, unnecessary frequent stop in transporting a medium can be reduced.

A sheet P2 (A6 size) in FIG. 7 is longer in width than the small sheet P1 and longer in width than the distance between the pair of first detection sections 21. If the sheet P2 having the width is transported in a slightly inclined state, one (the second detection section 22a in FIG. 7) of the pair of the second detection sections 22 detects the sheet P2 and both of the pair of the first detection sections 21 detect the sheet P2 as illustrated in FIG. 7. In such a state, the controller 23 stops the sheet transport as will be described below.

Figure 10:
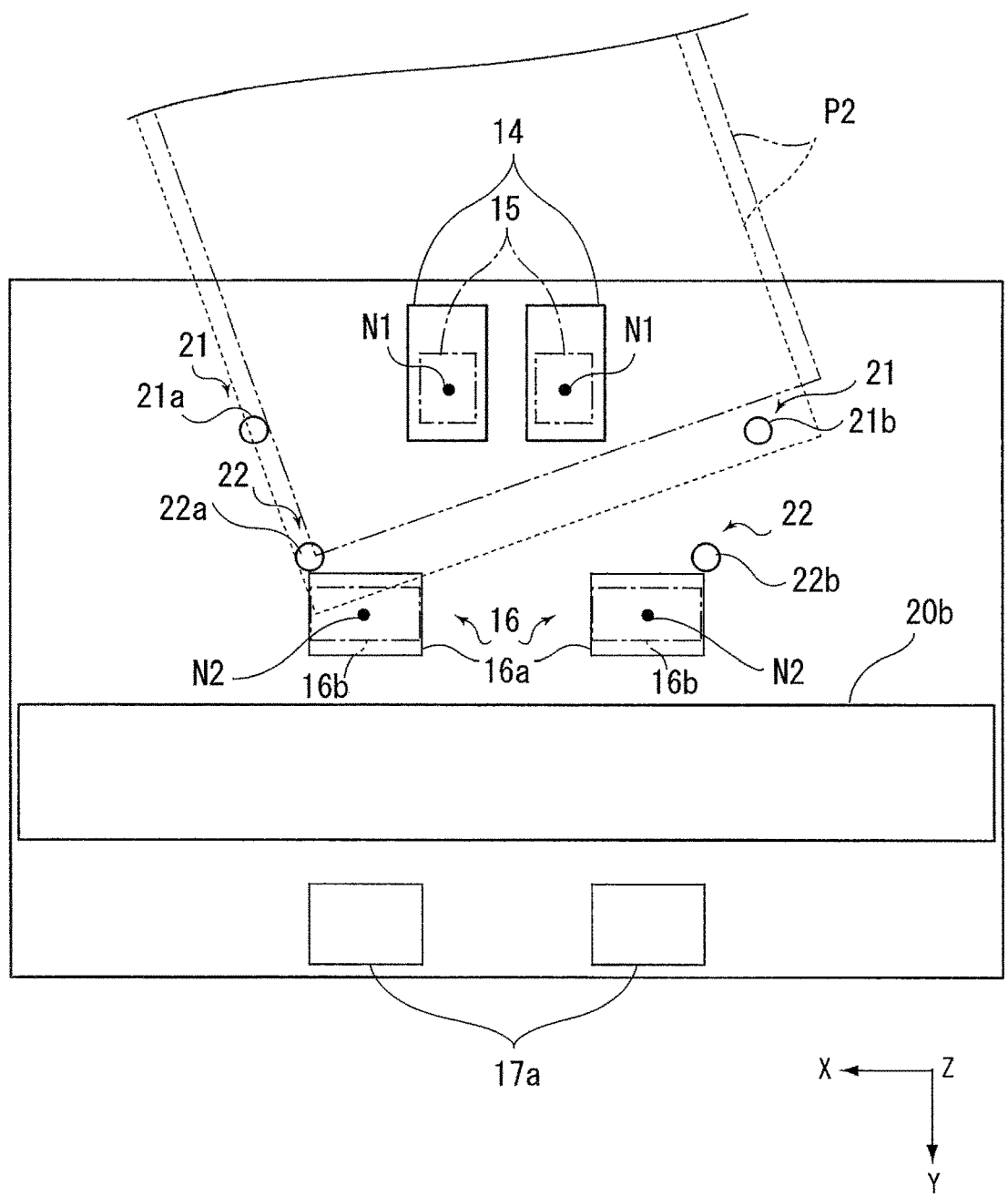
FIG. 10 illustrates other transport states of the sheet.

If the sheet P2 is largely inclined, one (the second detection section 22a) of the pair of the second detection sections 22 detects the sheet P2 and neither of the pair of the first detection sections 21 detects the sheet P2 as illustrated in FIG. 10 by the chain double-dashed line P2, and the transport of the sheet P2 is continued. As the sheet P2 (chain double-dashed line) is continued to be transported for a while to the position indicated by the dotted line in FIG. 10, one (the second detection section 22a) of the pair of the second detection sections 22 detects the sheet P2 and both of the pair of the first detection sections 21 detect the sheet P2. Then, the controller 23 stops transporting the sheet.

When both of the second detection sections 22a and 22b have detected the sheet, that is, the sheet is within the allowable skew range, the controller 23 can continue transporting the sheet in any of the following detection states: both of the first detection sections 21a and 21b have detected the sheet (the sheet P2 in FIG. 6), one of the first detection section 21a and the first detection section 21b has detected the sheet (the sheet P2 in FIG. 8), and neither of the first detection sections 21a and 21b have detected the sheet (the sheet P1 in FIG. 6).

Cases Controller Stops Transporting Based on Determination Results by First Detection Sections and Second Detection Sections The controller 23 stops transporting the sheet when only one of the pair of the second detection sections 22 (for example, the second detection section 22a in FIG. 7) has detected the sheet and both of the pair of the first detection sections 21a and 21b have detected the sheet as the sheet P2 in FIG. 7. More specifically, for example, when the sheet that has been detected by the second detection section 22a in FIG. 7 is not detected by the second detection section 22b within the predetermined time (that is, the sheet is beyond the allowable skew range), and if both of the first detection sections 21a and 21b have detected the sheet, the controller 23 stops transporting the sheet.

When both of the first detection sections 21a and 21b have detected the sheet, it can be determined that the sheet being transported has a certain width (a width wider than at least the distance between the pair of the first detection sections 21), and when only one of the pair of the second detection sections 22 has detected the sheet (that is, the sheet is beyond the allowable skew range), it can be determined that the sheet has been skewed as the sheet P2 in FIG. 7. In such a case, the controller 23 stops transporting the sheet to prevent the skewed sheet from being transported, and thereby the occurrence of paper jam, image reading failure, or the like can be prevented.

To "stop transporting the sheet P", the controller 23 turns off the driving of the feeding rollers 14 or turns off the driving of both the feeding rollers 14 and the transport roller pair 16. By turning off the driving of both the feeding rollers 14 and the transport roller pair 16, the transport of the sheet P can be stopped more reliably; however, for example, in reading a plurality of sheets, if feeding of subsequent media is to be stopped while images on the preceding media are being read, only the driving of the feeding rollers 14 may be turned off while the transport of the preceding media by the transport roller pair 16 is continued.

The sheet P2 illustrated in FIG. 7 has a width close to the distance between the pair of the first detection sections 21. If such a sheet P2 is shifted further in the +X direction (the medium width direction) than the sheet P2 in FIG. 7 and the sheet P2 is transported (the sheet P2 in FIG. 9) in a skewed state similar to the sheet P2 in FIG. 7, in some cases, only one of the pair of the second detection sections 22 (for example, the second detection section 22a in FIG. 9) may detect the sheet, the first detection section 21a on the same side as the second detection section 22a, which has detected the sheet, may not detect the sheet, and the first detection section 21b may detect the sheet.

The controller 23 stops transporting the sheet when only one of the pair of the second detection sections 22 (for example, the second detection section 22a in FIG. 9) has detected the sheet, the first detection section 21a on the same side as the second detection section 22a, which has detected the sheet, has not detected the sheet, and the first detection section 21b has detected the sheet. Accordingly, the sheet can be prevented from being transported in the skewed state as the sheet P2 in FIG. 9, and thereby the occurrence of paper jam, image reading failure, or the like can be prevented.

As described above, the controller 23 determines whether to stop transporting the sheet or continue transporting the sheet based on the results of determination by the first detection sections 21 and the second detection sections 22. Consequently, the opportunities for determining whether the sheet is being transported in an allowable transport state can be increased and thereby frequent stop in sheet transport can be prevented.

To stack and mount a plurality of sheets of different sizes onto the medium mounting section 11, that is, in a so-called mixed loading, it is preferable that the respective sheets of different sizes be aligned center in the width direction rather than aligned at an end side on one side in the width direction to reduce erroneous detection due to shifts in sheet positions in the width direction.

This embodiment employs the center-paper-feeding scanner 1 that includes the feeding rollers 14 at the central area in the medium width direction and the edge guides 12 that can be moved in the opposite directions to center a sheet P in the width direction. Alternatively, for example, an embodiment of the invention may employ a one-side-feeding scanner that includes the edge guides 12 in which one edge guide is fixed to the medium mounting section 11 and the other edge guide 12 can be moved with respect to the medium mounting section 11.

It should be noted that the first detection sections 21 may be provided on the edge guides 12. For example, end portions 19 (FIG. 3) of the edge guides 12 may be extended to positions closer to the downstream side than the first positions N1 in the Y-axis direction and the first detection sections 21 may be provided on the extended end portions 19.

Second Embodiment

Figure 11:
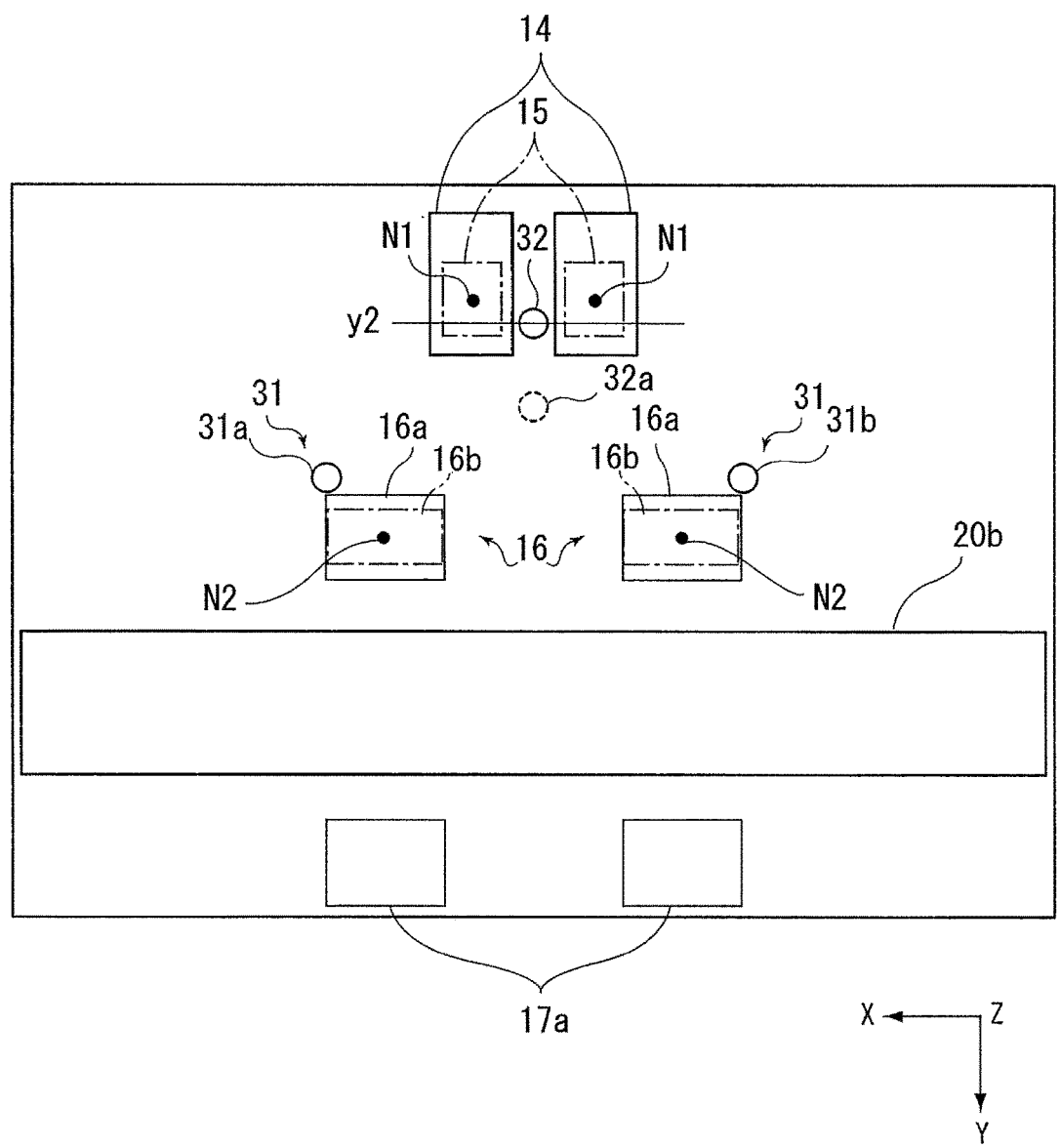
FIG. 11 is a schematic plan view illustrating main components according a second embodiment.
Figure 12:
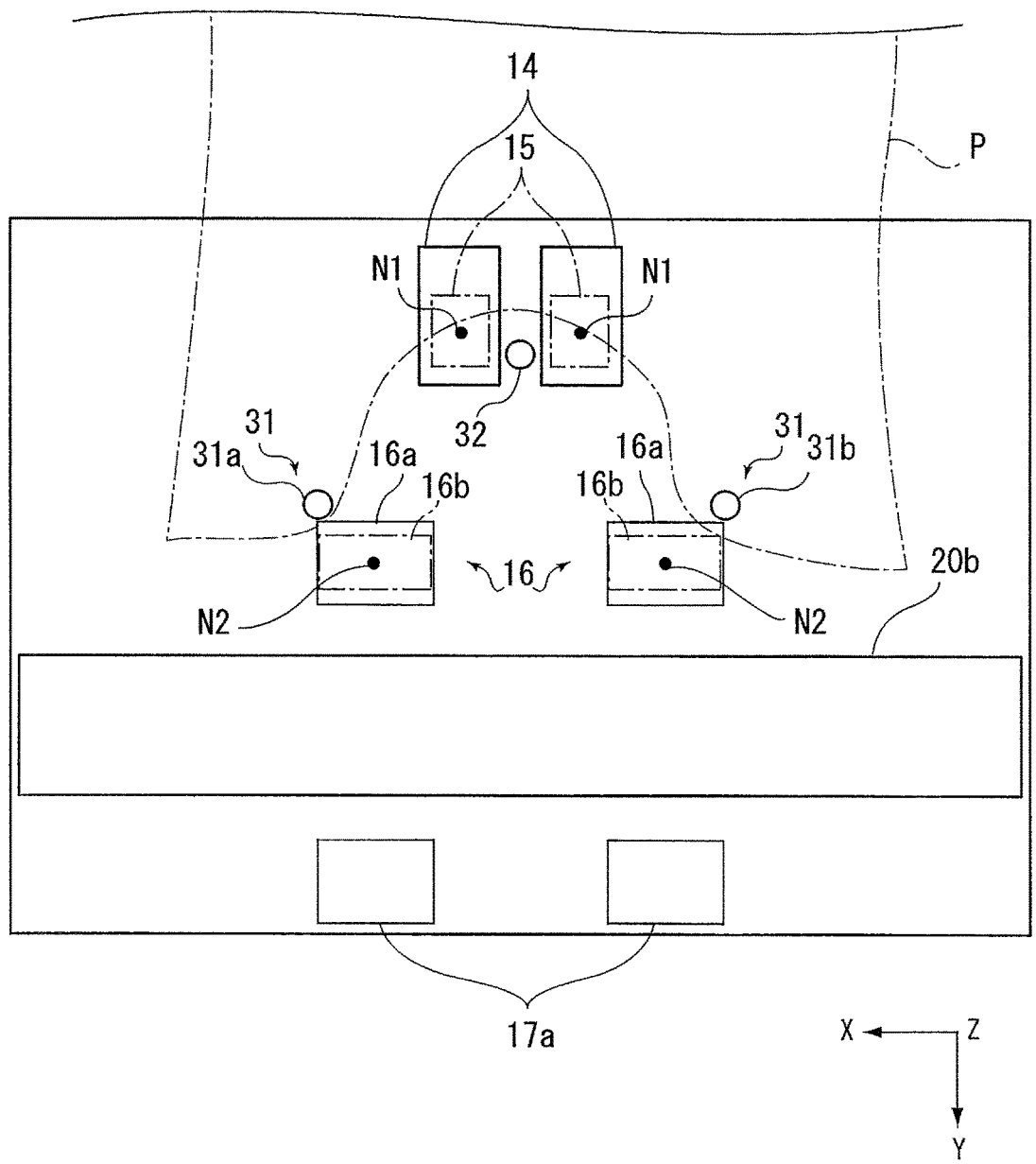
FIG. 12 is a schematic plan view illustrating an example problem occurred when end portions of a sheet in a width direction are transported forward and a central area is delayed.
Figure 13:
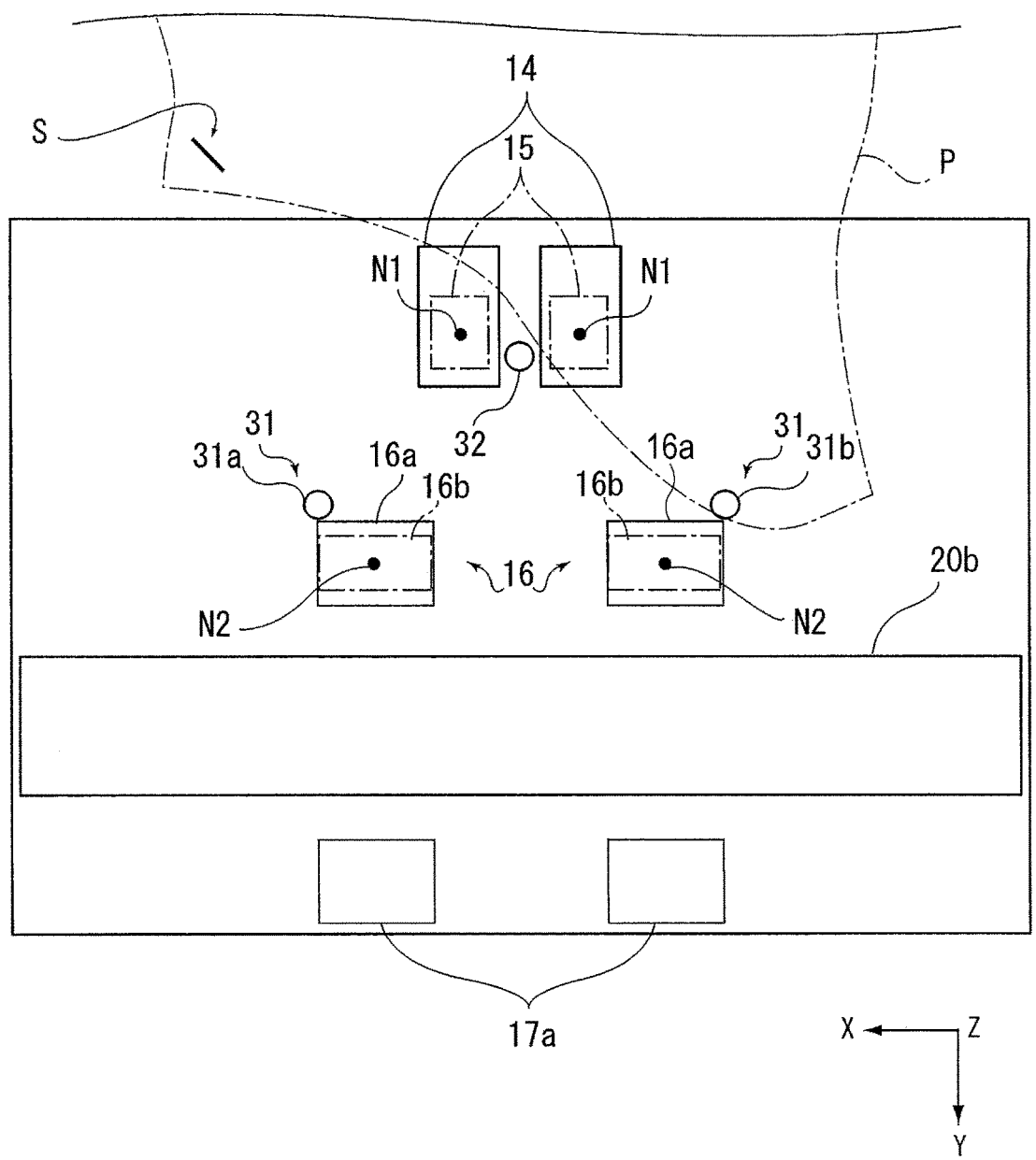
FIG. 13 is a schematic plan view illustrating another example problem occurred when an end portion of a sheet in a width direction is transported forward and a central area is delayed.

A second embodiment will be described with reference to FIG. 11 to FIG. 13. FIG. 11 is a schematic plan view illustrating main components according the second embodiment. FIG. 12 is a schematic plan view illustrating an example problem occurred when end portions of a sheet in the width direction are transported forward and a central area is delayed. FIG. 13 is a schematic plan view illustrating another example problem occurred when end portions of a sheet in the width direction are transported forward and a central area is delayed. In the following embodiments, the same reference numerals are given to components similar to those in the first embodiment, and their descriptions will be omitted. In the second embodiment, in the medium transport direction, downstream side detection sections 31 and an upstream side detection section 32 for detecting a sheet are disposed between the first positions N1, which are the nip positions of the feeding rollers 14 and the separation rollers 15, and the second positions N2, which are nip positions of the transport roller pair 16, as illustrated in FIG. 11. The controller 23 controls the transport of a medium based on results of detection by the downstream side detection section 31 and the upstream side detection section 32.

This embodiment employs optical sensors similar to those for the first detection sections 21 and the second detection sections 22 according to the first embodiment for the downstream side detection sections 31 and the upstream side detection section 32. Instead of the optical sensors, the ultrasonic sensors or the lever sensors described in the first embodiment may be employed.

The downstream side detection sections 31 are provided as a pair with a space in the medium width direction such that the downstream side detection sections 31 are disposed at both sides of the feeding rollers 14 and the transport roller pair 16. The downstream side detection section 31 on the +X direction side is a downstream side detection section 31a and the downstream side detection section 31 on the −X direction side is a downstream side detection section 31b. The downstream side detection sections 31 are disposed at positions very close to the end portions of the transport roller pair 16 in the medium width direction similarly to the second detection sections 22 according to the first embodiment.

The upstream side detection section 32 is disposed between the pair of the downstream side detection sections 31 in the medium width direction and between the first position N1 and the downstream side detection section 31 in the medium transport direction. In this embodiment, the upstream side detection section 32 is disposed so as to overlap the feeding rollers 14 at a position y2 (FIG. 11) in the medium transport direction (+Y direction). Alternatively, the upstream side detection section 32 may be disposed, for example, at a position 32a, that is, a position that does not overlap the feeding rollers 14.

Next, with reference to FIG. 12 and FIG. 13, the sheet transport control performed by the controller 23 based on the results of detection by the downstream side detection sections 31 and the upstream side detection section 32 will be described. The controller 23 stops sheet transport when at least one of the pair of the downstream side detection sections 31 has detected a sheet and the upstream side detection section has not detected the sheet. The state "at least one of the pair of the downstream side detection sections 31 has detected a sheet" includes both a state in which after one of the pair of the downstream side detection section 31 (for example, the downstream side detection section 31a) has detected a sheet, the other downstream side detection section 31 (for example, the downstream side detection section 31b) detects the sheet within the predetermined time, and a state in which after the one of the pair of the downstream side detection sections 31 has detected a sheet, the other downstream side detection section 31 has not detected the sheet within the predetermined time.

In some cases, when a sheet P that has been set on the medium mounting section 11 (FIG. 1) is nipped and separated by the feeding rollers 14 and the separation rollers 15, the sheet P may be caught at the first positions N1 (nip positions), which are separation positions. While the sheet P is being caught at the first positions N1, if the feeding rollers 14 continues to be driven, the sheet P may be pulled and bent around the first positions N1. Around the first positions N1, that is, a central portion of the sheet P in the width direction, the sheet P is bent such that the both end portions of the sheet P in the width direction are pulled toward the medium transport direction downstream side as illustrated in FIG. 12. If the bent sheet P is nipped at the both ends by the transport roller pair 16 and transported with the central portion being caught at the first positions N1, the sheet P may be torn or largely damaged to form severe creases.

Furthermore, for example, if the sheets P that have been stapled with a staple S as illustrated in FIG. 13 are erroneously set on the medium mounting section 11 (FIG. 1), only the −X direction side, which is not stapled with the staple S, of the uppermost sheet P is fed and the +X direction side, which is stapled with the staple S, of the sheet P is not fed and remains on the side closer to the upstream side than the nip positions (the first positions N1) of the feeding rollers 14 and the separation rollers 15. Also in this case, if the feeding rollers 14 continue to be driven, the sheet P may be largely damaged.

In this embodiment, if at least one of the pair of the downstream side detection sections 31 has detected the sheet and the upstream side detection section 32 has not detected the sheet, it can be determined that the sheet P is in the state illustrated in FIG. 12 or in the state illustrated in FIG. 13. Consequently, the controller 23 stops transporting the sheet P. With this control, the controller 23 can detect a problem in which at least one end portion of the sheet P in the width direction is transported forward and a central portion (a portion between the pair of the downstream side detection sections 31) is delayed as in FIG. 12 or FIG. 13, and stop transporting the sheet P. Accordingly, the sheets P can be prevented from being largely damaged and transported.

Third Embodiment

Figure 14:
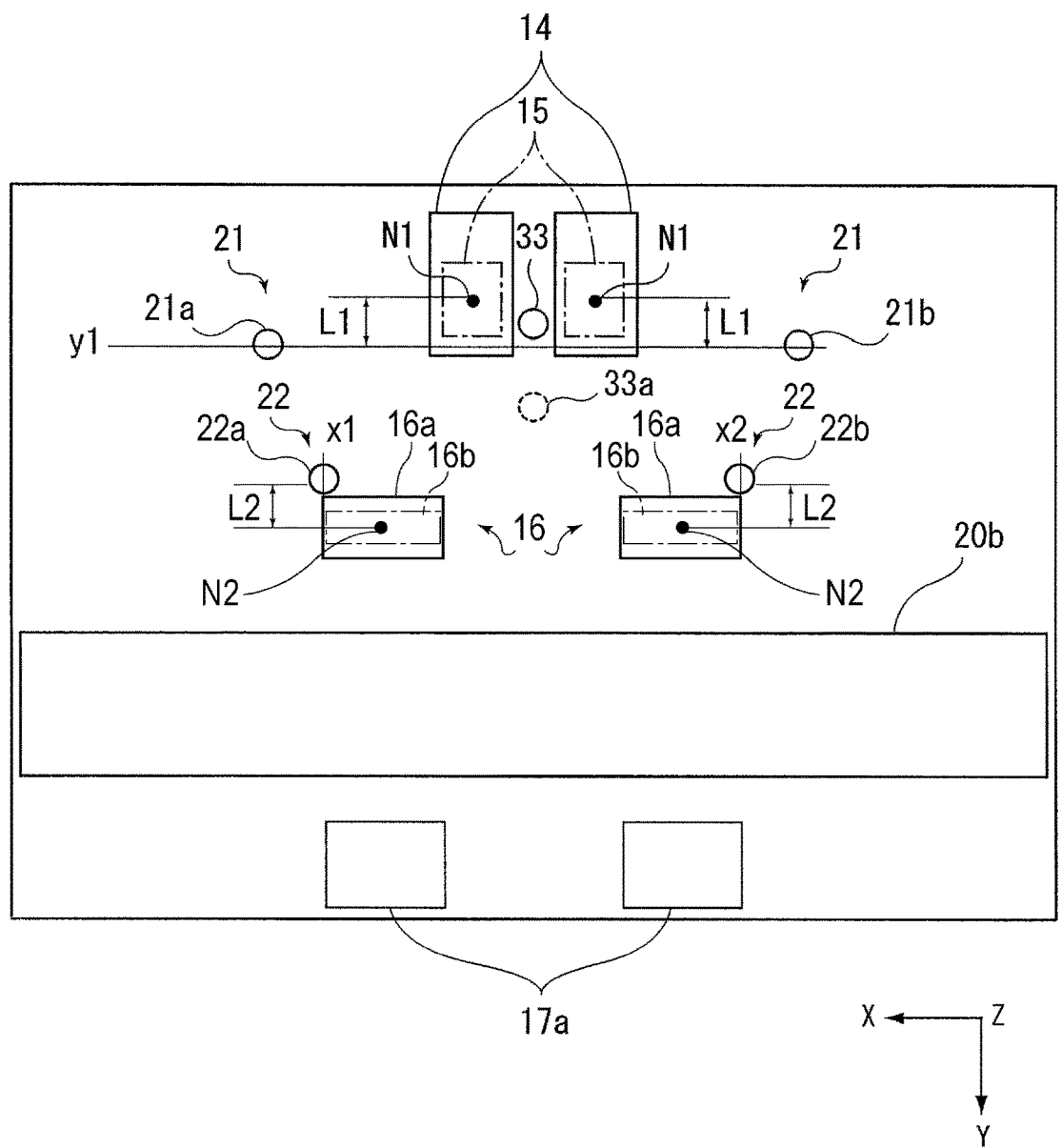
FIG. 14 is a schematic plan view illustrating main components according a third embodiment.
Figure 15:
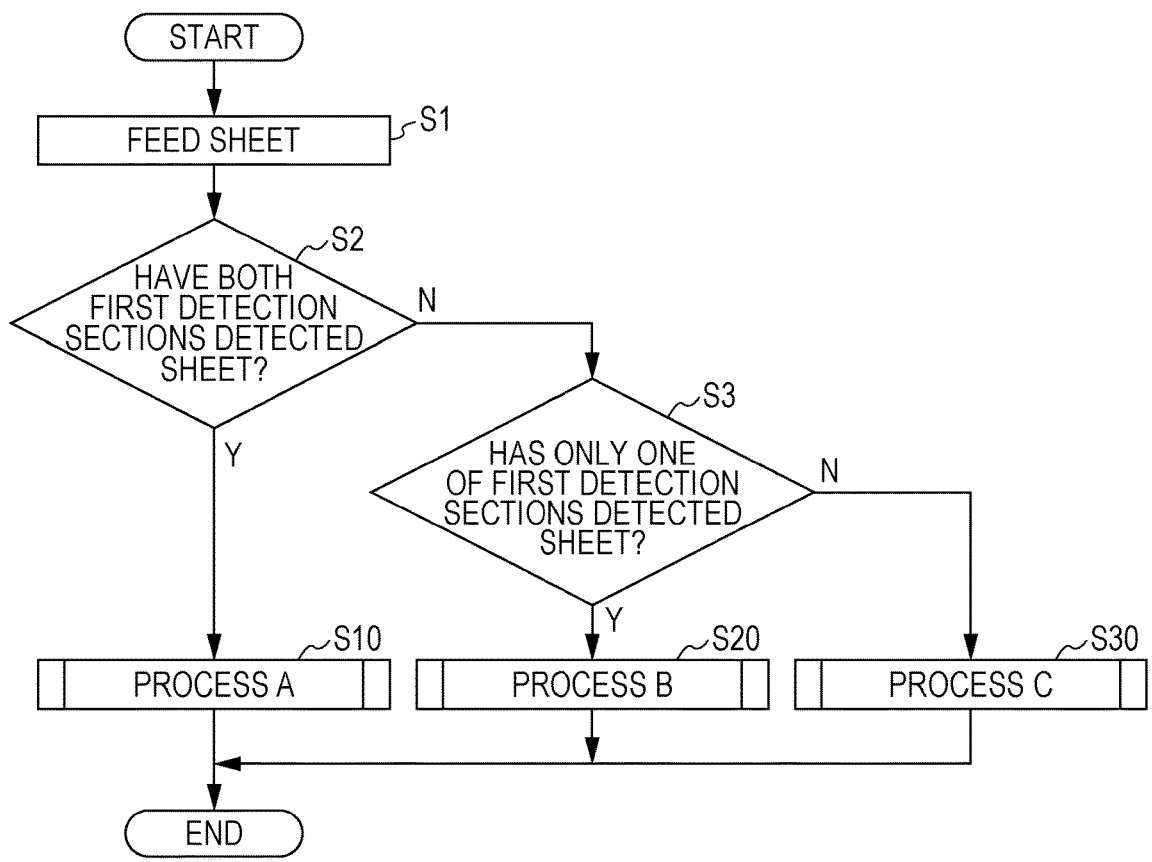
FIG. 15 is a flowchart illustrating a process to be performed when a first detection section has detected a sheet.

A third embodiment will be described with reference to FIG. 14. FIG. 14 is a schematic plan view illustrating main components according the third embodiment. The third embodiment includes a third detection section 33 for detecting a sheet in addition to the first detection sections 21 and the second detection sections 22 described in the first embodiment.

The third detection section 33 has a configuration similar to that of the upstream side detection section 32 in the second embodiment. Specifically, the third detection section 33 is disposed between the pair of the second detection sections 22 (correspond to the pair of the downstream side detection sections 31 in the second embodiment) in the medium width direction and on the downstream side of the first positions N1 and upstream side of the pair of the second detection sections 22 in the medium transport direction as illustrated in FIG. 14.

The third embodiment includes the first detection sections 21, the second detection sections 22, and the third detection section 33, and thus the controller 23 can perform both the control based on the results of detection by the first detection sections 21 and the second detection sections 22 described in the first embodiment and the control based on the results of detection by the second detection sections 22 (the downstream side detection sections 31) and the third detection section 33 (the upstream side detection section 32) described in the second embodiment.

In this embodiment, the third detection section 33 is disposed on the upstream side of the pair of first detection sections 21 in the medium transport direction. The controller 23 stops sheet transport when at least one of the pair of the first detection sections 21 has detected a sheet and the third detection section 33 has not detected the sheet. With this control, the controller 23 can detect a problem in which end portion sides of the sheet in the width direction are transported forward and a central portion is delayed at a position closer to the feeding rollers 14 than the second detection sections 22 and stop transporting the medium, and thereby damages to the sheet can be further reduced. The third detection section 33 may be provided at a position 33a in FIG. 14, that is, a position between the second detection sections 22 and the first detection sections 21 in the medium transport direction.

The transport operations based on the results of detection by the first detection sections and the second detection sections will be described with reference to FIG. 15 to FIG. 19. First, a process to be performed when the first detection sections detect a sheet P will be described with reference to FIG. 15. The controller 23 drives the feeding rollers 14 by a drive source (not illustrated) to feed a sheet P (S1). Hereinafter, the control to be performed by the controller 23 will be described. In response to the feeding of the sheet P, the controller 23 determines whether both of the first detection sections 21 have detected the sheet P (S2). If both of the first detection sections 21 have detected the sheet P, the controller 23 performs a process A, which will be described below (S10). If not both of the first detection sections 21 have detected the sheet P, the controller 23 determines whether one of the first detection sections 21 has detected the sheet P (S3). If one of the first detection sections 21 has detected the sheet P, the controller 23 performs a process B, which will be described below (S20). If one of the first detection sections 21 has not detected the sheet P, that is, neither of the first detection sections 21 has detected the sheet P, the controller 23 performs a process C, which will be described below (S30).

Figure 16:
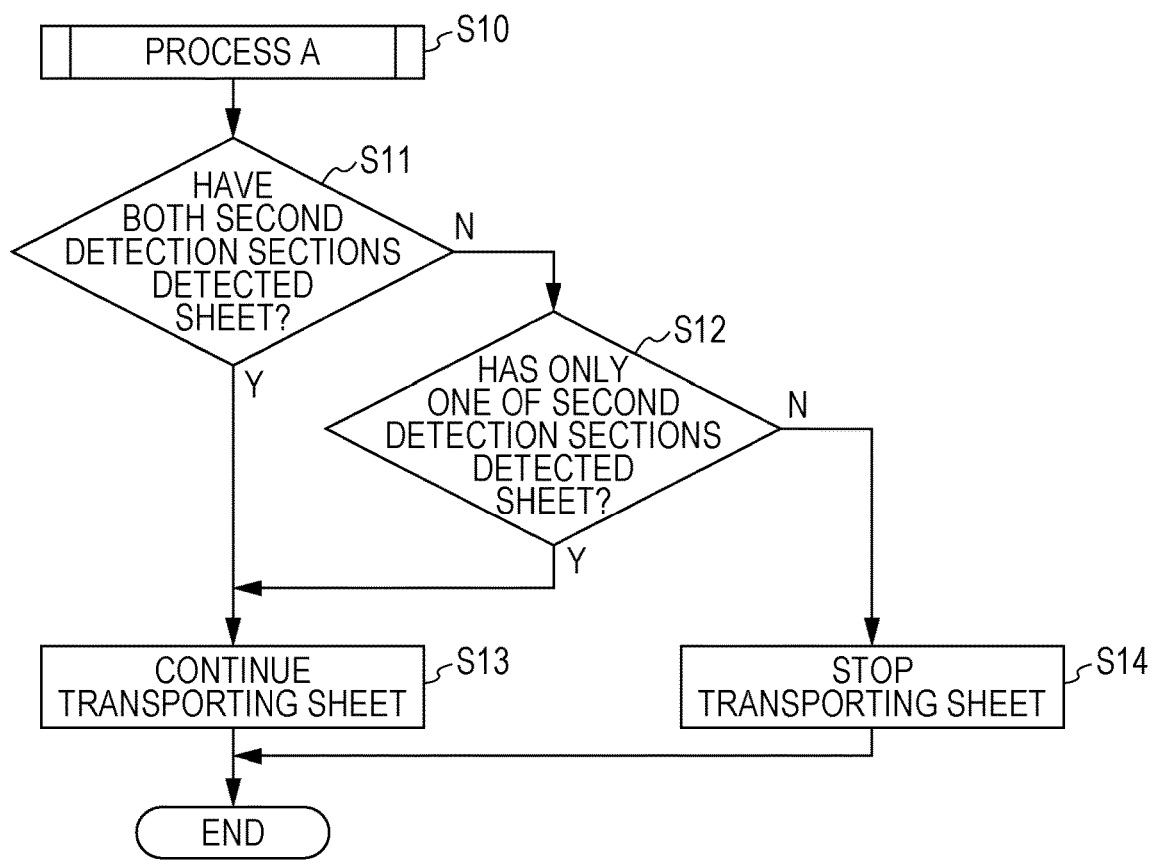
FIG. 16 illustrates the process A.

The process A will be described with reference to FIG. 16. In the process A (S10), first, the controller 23 determines whether both of the second detection sections 22 have detected the sheet P (S11). If both of the second detection sections 22 have detected the sheet P, the controller 23 continues transporting the sheet P (S13). If not both of the second detection sections 22 have detected the sheet P, the controller 23 determines whether only one of the second detection sections 22 has detected the sheet P (S12). If only one of the second detection sections 22 has detected the sheet P, the controller 23 continues transporting the sheet P (S13). If neither of the second detection sections 22 has detected the sheet P, the controller 23 stops transporting the sheet P (S14).

Figure 17:
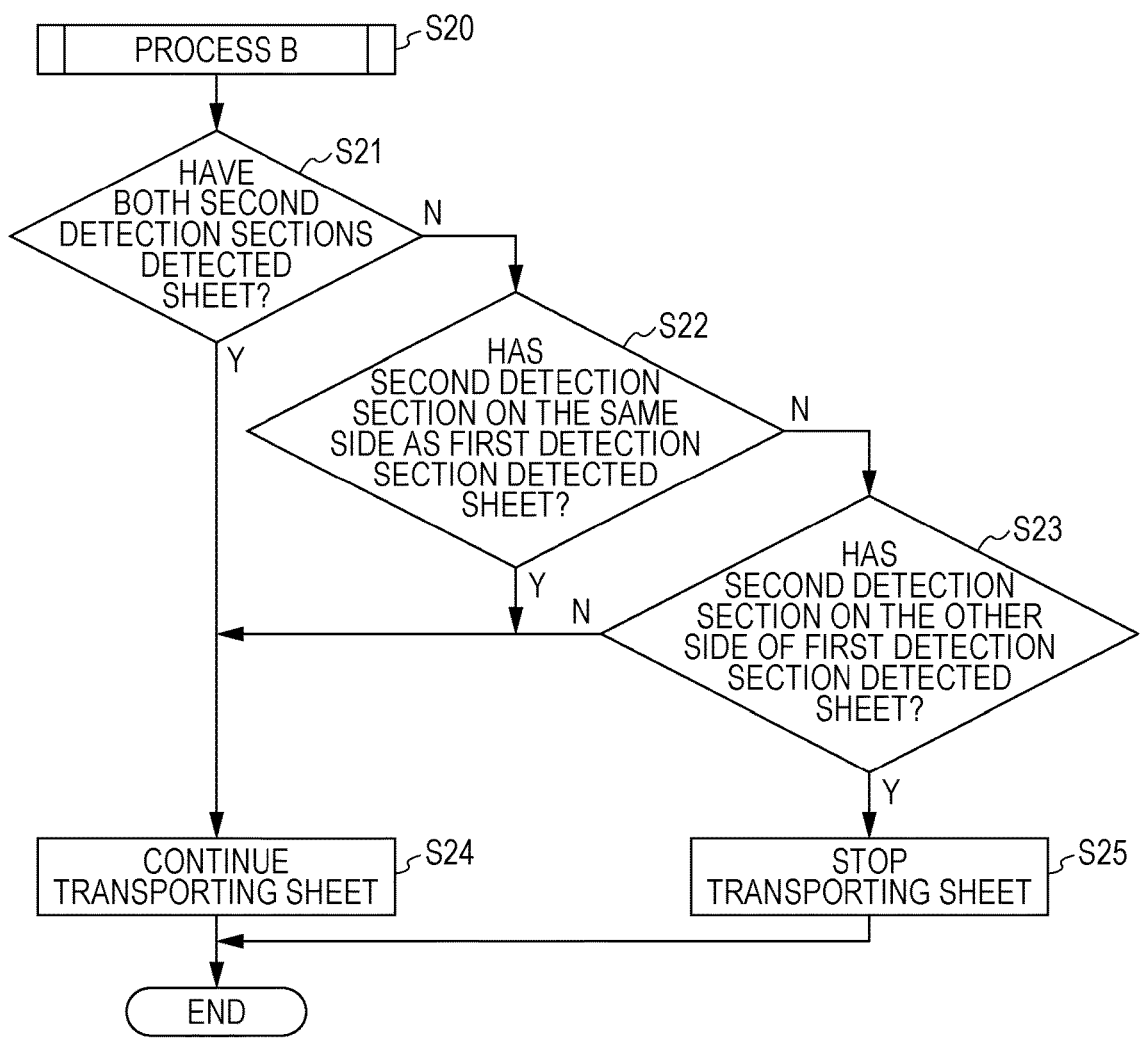
FIG. 17 illustrates the process B.

The process B will be described with reference to FIG. 17. In the process B (S20), first, the controller 23 determines whether both of the second detection sections 22 have detected the sheet P (S21). If both of the second detection sections 22 have detected the sheet P, the controller 23 continues transporting the sheet P (S24). If not both of the second detection sections 22 have detected the sheet P, the controller 23 determines whether only the second detection section 22 disposed on the same side as the first detection section 21 that has detected the sheet P has detected the sheet P (S22). If only the second detection section 22 disposed on the same side as the first detection section 21 that has detected the sheet P has detected the sheet P, the controller 23 continues transporting the sheet P (S24). If the second detection section 22 disposed on the same side as the first detection section 21 that has detected the sheet P has not detected the sheet P, the controller 23 determines whether only the second detection section 22 disposed on the side different from the side of the first detection section 21 has detected the sheet P (S23). If only the second detection section 22 disposed on the side different from the side of the first detection section 21 has detected the sheet P, the controller 23 stops transporting the sheet P (S25). If only the second detection section 22 disposed on the side different from the side of the first detection section 21 has not detected the sheet P, that is, neither of the second detection sections 22 has detected the sheet P, the controller 23 continues transporting the sheet P (S24).

Figure 18:
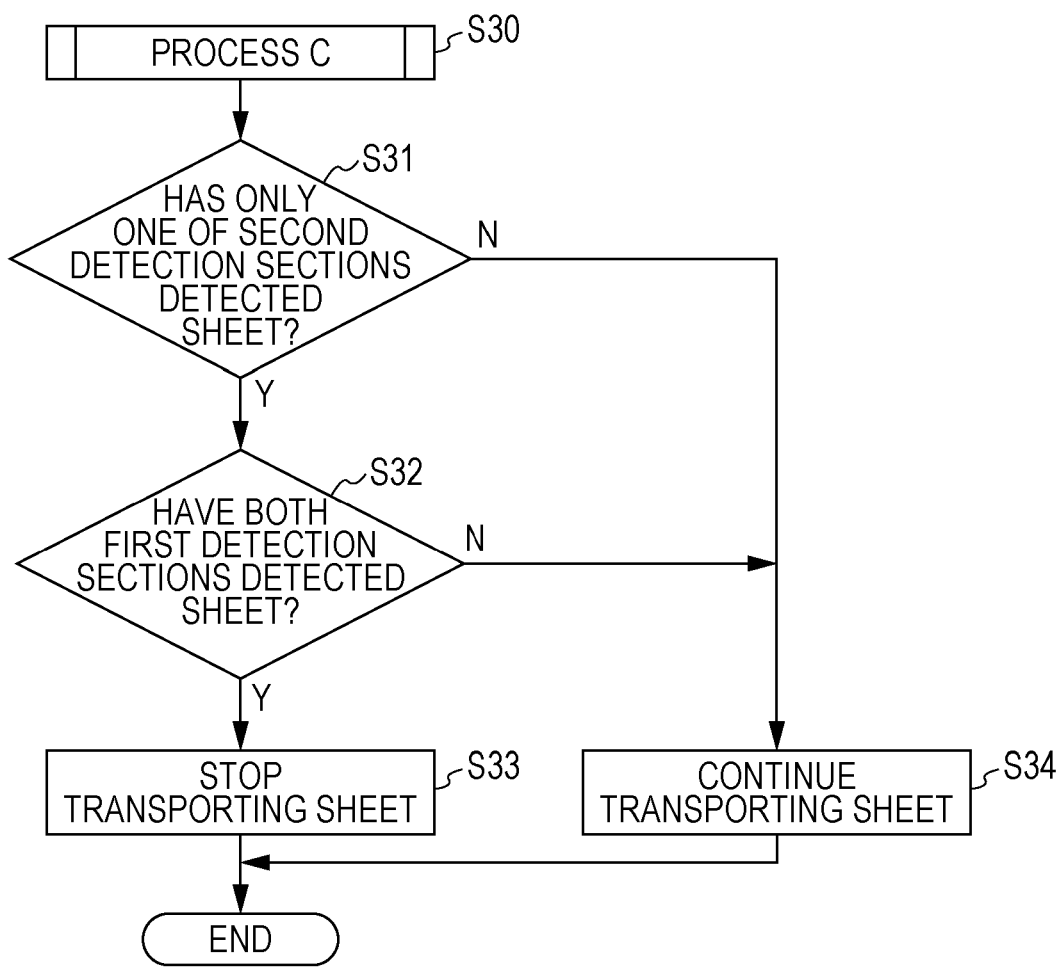
FIG. 18 illustrates the process C.

The process C will be described with reference to FIG. 18. In the process C (S30), first, the controller 23 determines whether only one of the second detection sections 22 has detected the sheet P (S31). If only one of the second detection sections 22 has detected the sheet P, then, the controller 23 determines whether both of the first detection sections 21 have detected the sheet P (S32). If both of the first detection sections 21 have detected the sheet P, the controller 23 stops transporting the sheet P (S33). If only one of the second detection sections 22 has not detected the sheet P, or, neither of the first detection sections 21 has detected the sheet P, the controller 23 continues transporting the sheet P (S34).

Figure 19:
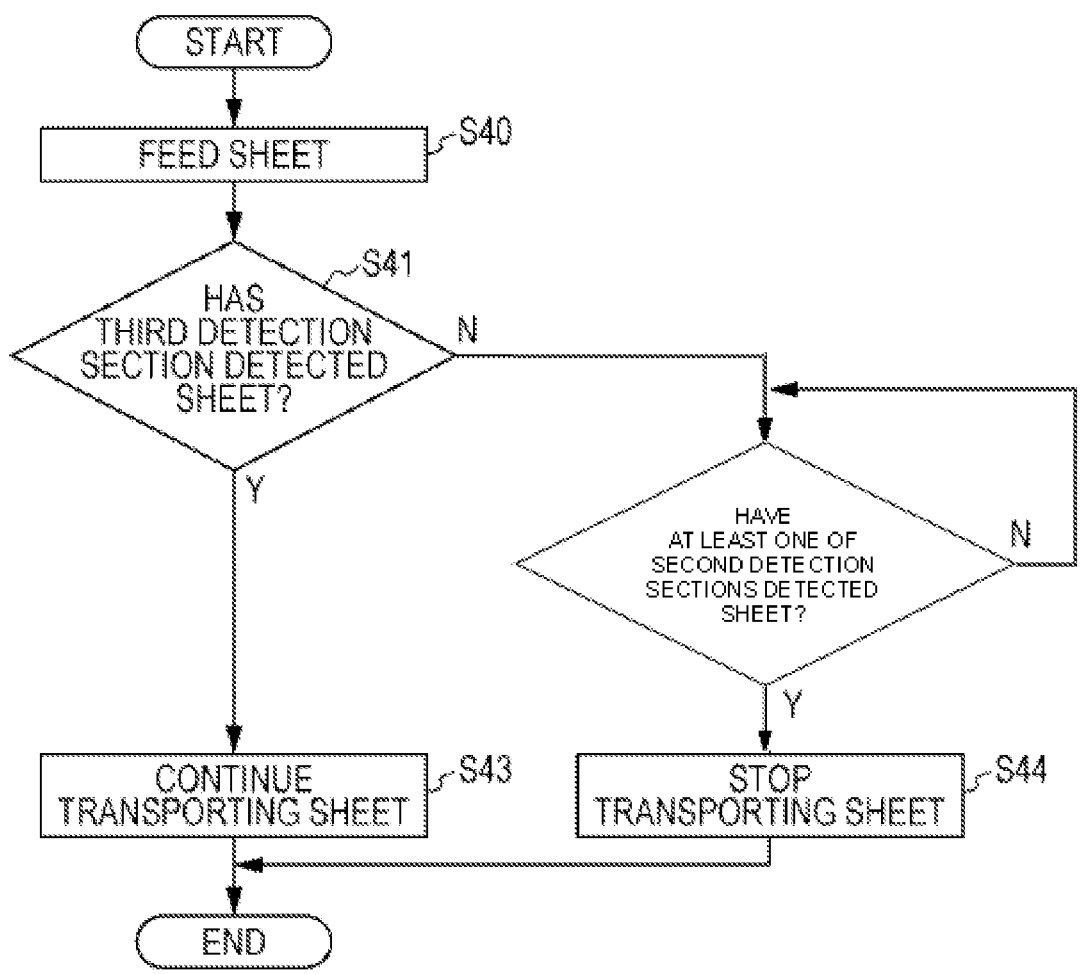
FIG. 19 is a flowchart illustrating a process to be performed when a third detection section has detected a sheet.

A process to be performed when the third detection section detects a sheet P will be described with reference to FIG. 19. The controller 23 drives the feeding rollers 14 by a drive source (not illustrated) to feed a sheet P (S40). Hereinafter, the control to be performed by the controller 23 will be described. In response to the feeding of the sheet P, the controller 23 determines whether the third detection section has detected the sheet P (S41). If the third detection section has detected the sheet P, the controller 23 continues transporting the sheet P (S43). If the third detection section has not detected the sheet P, the controller 23 determines whether at least one of the second detection sections 22 have detected the sheet P (S42). If at least one of the second detection sections 22 have detected the sheet P, the controller 23 stops transporting the sheet P (S44). If neither of the second detection sections 22 has detected the sheet P, the controller 23 determines whether at least one of the second detection sections 22 have detected the sheet P (S42).

It is to be understood that the present invention is not limited to the above-described embodiments, various modifications can be made within the scope of the following claims, and these modifications are included within the scope of the invention.

The entire disclosure of Japanese Patent Application No. 2017-147322, filed Jul. 31, 2017 is expressly incorporated by reference herein.

What is claimed is:

1. An image reading apparatus for reading media supported on a media mounter, the image reading apparatus comprising:
    a feeding roller configured to feed in a first direction the media supported on the media mounter;
    a separation roller configured to, with the feeding roller, nip and separate at a separation nip position a medium from the media supported on the media mounter;
    a transport roller pair disposed downstream from the feeding roller in the first direction, the transport roller pair being configured to nip therebetween, at a transport nip position, the medium separated by the separation roller and to transport the medium;
    a reader disposed downstream from the transport roller in the first direction, and configured to read the medium transported by the transport roller pair;
    a first detector and a second detector configured to detect the medium fed by the feeding roller, the first detector and the second detector being disposed between the separation nip position and the transport nip position in the first direction and on opposite sides of the feeding roller with respect to a second direction that intersects in the first direction;
    a third detector and a fourth detector configured to detect the medium, the third detector and the fourth detector being disposed between the first detector and the transport nip position with respect to the first direction, the third detector being disposed between the first detector and the transport roller with respect to the second direction and the fourth detector being disposed between the second detector and the transport roller with respect to the second direction; and
    a controller configured to control the transport of the medium based on detection results of detection by the first detector, the second detector, the third detector and the fourth detector, the controller determining whether to stop transport of the medium or to continue transport of the medium based on the detection results.

2. The image reading apparatus according to claim 1, wherein the controller continues transporting the medium when the third detector detected the medium, and neither the first detector nor the second detector detected the medium.

3. The image reading apparatus according to claim 2, wherein the controller stops transporting the medium when the first detector, the second detector, and the third detector detected the medium, and the fourth detector did not detect the medium.

4. The image reading apparatus according to claim 2, wherein the controller stops transporting the medium when the second detector and the third detector detected the medium, and the first detector and the fourth detector did not detect the medium.

5. The image reading apparatus according to claim 1, further comprising:
 a fifth detector configured to detect the medium, the fifth detector being disposed between the separation nip position and the third detector with respect to the first direction, between the separation nip position and the fourth detector with respect to the first direction, and between the third detector and the fourth detector with respect to the second direction,
 wherein the controller stops transporting the medium when the third detector detected the medium and the fifth detector did not detect the medium.

6. The image reading apparatus according to claim 5, wherein:
 the fifth detector is disposed between the separation nip position and the first detector with respect to the first direction and between the separation nip position and the second detector with respect to the first direction, and
 the controller stops transporting the medium when the first detector detected the medium and the fifth detector did not detect the medium.

7. The image reading apparatus according to claim 1, wherein the first detector is disposed at a position overlapping part of the feeding roller in the first direction.

8. The image reading apparatus according to claim 1, wherein the shortest distance between the third detector and the transport nip position is shorter than the shortest distance between the first detector and the separation nip position.

9. The image reading apparatus according to claim 1, wherein the feeding roller and the transport roller pair are disposed in a central area with respect to the second direction.

10. An image reading apparatus for reading media supported on a media mounter, the image reading apparatus comprising:
 a feeding roller configured to feed in a first direction the media supported on the media mounter;
 a separation roller configured to, with the feeding roller, nip and separate at a separation nip position a medium from the media supported on the media mounter;
 a transport roller pair disposed downstream from the feeding roller in the first direction, the transport roller pair being configured to nip therebetween, at a transport nip position, the medium separated by the separation roller and to transport the medium;
 a reader disposed downstream from the transport roller in the first direction, and configured to read the medium transported by the transport roller pair;
 a first detector and a second detector configured to detect the medium fed by the feeding roller, the first detector and the second detector being disposed between the separation nip position and the transport nip position in the first direction and on opposite sides of the transport roller with respect to a second direction that intersects in the first direction;
 a third detector configured to detect the medium, the third detector being disposed between the separation nip position and the first detection in the first direction, between the separation nip position and the second detection in the first direction and between the first detector and the second detector with respect to the second direction; and
 a controller configured to control the transport of the medium based on detection results of detection by the first detector, the second detector and the third detector, wherein the controller stops transporting the medium when the first detector has detected the medium and the third detector has not detected the medium.

* * * * *